(12) United States Patent
Spybey et al.

(10) Patent No.: US 10,072,644 B2
(45) Date of Patent: Sep. 11, 2018

(54) PORTABLE ALTERNATIVE-ENERGY POWERED PUMP ASSEMBLY

(71) Applicant: Kickstart International, Inc., San Francisco, CA (US)

(72) Inventors: Alan C. Spybey, Nairobi (KE); Martin J. Fisher, San Francisco, CA (US)

(73) Assignee: Kickstart International, Inc., San Francisco, CA (US)

( * ) Notice: Subject to any disclaimer, the term of this patent is extended or adjusted under 35 U.S.C. 154(b) by 0 days.

(21) Appl. No.: 15/674,064

(22) Filed: Aug. 10, 2017

(65) Prior Publication Data

US 2018/0045188 A1 Feb. 15, 2018

Related U.S. Application Data

(60) Provisional application No. 62/373,212, filed on Aug. 10, 2016.

(51) Int. Cl.
| | |
|---|---|
| *F04B 17/00* | (2006.01) |
| *F04B 17/03* | (2006.01) |
| *F04B 17/02* | (2006.01) |
| *E21B 43/12* | (2006.01) |
| *E21B 43/01* | (2006.01) |
| *A01G 25/02* | (2006.01) |

(52) U.S. Cl.
CPC ............ *F04B 17/006* (2013.01); *F04B 17/02* (2013.01); *F04B 17/03* (2013.01); *A01G 25/02* (2013.01); *E21B 43/01* (2013.01); *E21B 43/128* (2013.01)

(58) Field of Classification Search
CPC .......... F04B 17/02; A01G 25/02; E21B 43/01

USPC ............................ 417/62; 137/565.3, 565.33
See application file for complete search history.

(56) References Cited

U.S. PATENT DOCUMENTS

| | | |
|---|---|---|
| 537,439 A | 4/1895 | Conley |
| 595,205 A | 12/1897 | Quick |
| 2,207,220 A | 7/1940 | Hollander |
| 2,653,552 A | 9/1953 | Geeraert |
| 2,660,384 A | 11/1953 | Smith |
| 2,941,473 A | 6/1960 | Lorenz |
| 3,203,352 A | 8/1965 | Schafranek |
| 3,259,073 A | 7/1966 | Burtis |
| 3,717,420 A | 2/1973 | Rachocki |
| 3,743,447 A | 7/1973 | Lynch |
| 3,830,593 A | 8/1974 | Chanal |
| 3,984,050 A | 10/1976 | Gustafsson |
| 4,167,374 A | 9/1979 | Smith |

(Continued)

FOREIGN PATENT DOCUMENTS

| | | |
|---|---|---|
| CA | 2236535 A1 | 11/1999 |
| CA | 2526054 A1 | 5/2006 |

(Continued)

OTHER PUBLICATIONS

International Search Report and Written Opinion of International Searching Authority for International Patent Application PCT/US2017/046305, dated Nov. 29, 2017, 11 pages.

*Primary Examiner* — Patrick Hamo
(74) *Attorney, Agent, or Firm* — Goodwin Procter LLP

(57) ABSTRACT

A modular pump system permits combining multiple discrete pump assemblies in serial and/or parallel configurations to tailor system output to user needs. The assemblies may be combined by hand quickly, without the needs for tools, to permit use in remote areas.

30 Claims, 16 Drawing Sheets

(56) References Cited

U.S. PATENT DOCUMENTS

| | | | |
|---|---|---|---|
| 5,038,817 A * | 8/1991 | Henry | F16L 37/26 137/315.29 |
| 5,059,226 A | 10/1991 | Schneider et al. | |
| 5,338,211 A | 8/1994 | Kodama et al. | |
| 5,404,943 A | 4/1995 | Strawn | |
| 5,713,727 A | 2/1998 | Veronesi et al. | |
| 5,899,228 A | 5/1999 | Smith, III | |
| 5,941,786 A | 8/1999 | Van Wijk et al. | |
| 6,086,339 A | 7/2000 | Jeffrey | |
| 6,106,026 A | 8/2000 | Smith, III | |
| 6,271,609 B1 | 8/2001 | Hollenbeck et al. | |
| 6,309,174 B1 | 10/2001 | Oklejas, Jr. et al. | |
| 6,790,017 B2 | 9/2004 | Takura et al. | |
| 6,902,211 B2 | 6/2005 | Wirth, Jr. et al. | |
| 7,067,944 B2 | 6/2006 | Lieu et al. | |
| 7,067,952 B2 | 6/2006 | Neal | |
| 7,108,569 B2 | 9/2006 | Cornell | |
| 7,112,905 B2 | 9/2006 | Chang et al. | |
| 7,154,200 B2 | 12/2006 | Neal | |
| 7,683,509 B2 | 3/2010 | Neal | |
| 7,928,348 B2 | 4/2011 | Neal | |
| 8,123,458 B2 | 2/2012 | Racer et al. | |
| 8,206,134 B2 * | 6/2012 | Moldovan | F04B 23/026 137/565.19 |
| 8,210,253 B2 * | 7/2012 | Head | E21B 43/121 166/105 |
| 8,394,204 B2 | 3/2013 | Buerkle et al. | |
| 8,556,598 B2 | 10/2013 | Zamudio et al. | |
| 8,893,775 B2 | 11/2014 | Bjoroy et al. | |
| 8,926,294 B2 | 1/2015 | Demers et al. | |
| 9,051,936 B2 | 6/2015 | Kallesoe et al. | |
| 2001/0014290 A1 | 8/2001 | Takura et al. | |
| 2002/0066568 A1 | 6/2002 | Buchanan et al. | |
| 2003/0044299 A1 | 3/2003 | Thomas et al. | |
| 2004/0191090 A1 | 9/2004 | Patel et al. | |
| 2006/0260331 A1 | 11/2006 | Andreychuk | |
| 2009/0226295 A1 | 9/2009 | Haertel et al. | |
| 2010/0074776 A1 | 3/2010 | Ludlow et al. | |
| 2013/0019969 A1 | 1/2013 | Scarsdale | |
| 2013/0039754 A1 | 2/2013 | Behnke et al. | |
| 2013/0209225 A1 | 8/2013 | Eslinger | |
| 2013/0263932 A1 | 10/2013 | Baxter et al. | |
| 2013/0294928 A1 | 11/2013 | Rosinski et al. | |
| 2014/0205385 A1 | 7/2014 | Bekker et al. | |
| 2014/0205466 A1 | 7/2014 | Best | |
| 2015/0031936 A1 | 1/2015 | LaRose et al. | |
| 2015/0104337 A1 | 4/2015 | Schoelen et al. | |
| 2015/0252808 A1 | 9/2015 | Rosinski et al. | |
| 2015/0260020 A1 | 9/2015 | Benson et al. | |
| 2016/0084254 A1 | 3/2016 | Dowling | |
| 2016/0146108 A1 | 5/2016 | Yates et al. | |

FOREIGN PATENT DOCUMENTS

| | | |
|---|---|---|
| CA | 2770255 A1 | 8/2013 |
| CN | 201852359 U | 6/2011 |
| CN | 202971134 U | 6/2013 |
| CN | 103387308 A | 11/2013 |
| CN | 103899542 A | 7/2014 |
| CN | 204124350 U | 1/2015 |
| CN | 204553319 U | 8/2015 |
| CN | 105183067 B | 3/2017 |
| DE | 3108214 A1 | 9/1982 |
| DE | 102012104311 A1 | 11/2013 |
| EP | 0648936 A1 | 4/1995 |
| EP | 1496256 A3 | 6/2010 |
| EP | 2665937 A1 | 11/2013 |
| FR | 2678987 A1 | 1/1993 |
| GB | 1085042 A | 9/1967 |
| KR | 20160046838 A | 4/2016 |
| WO | WO-2012087532 A1 | 6/2012 |
| WO | WO-2013086976 A1 | 6/2013 |
| WO | WO-2015010033 A1 | 1/2015 |
| WO | WO-2015057335 A1 | 4/2015 |

* cited by examiner

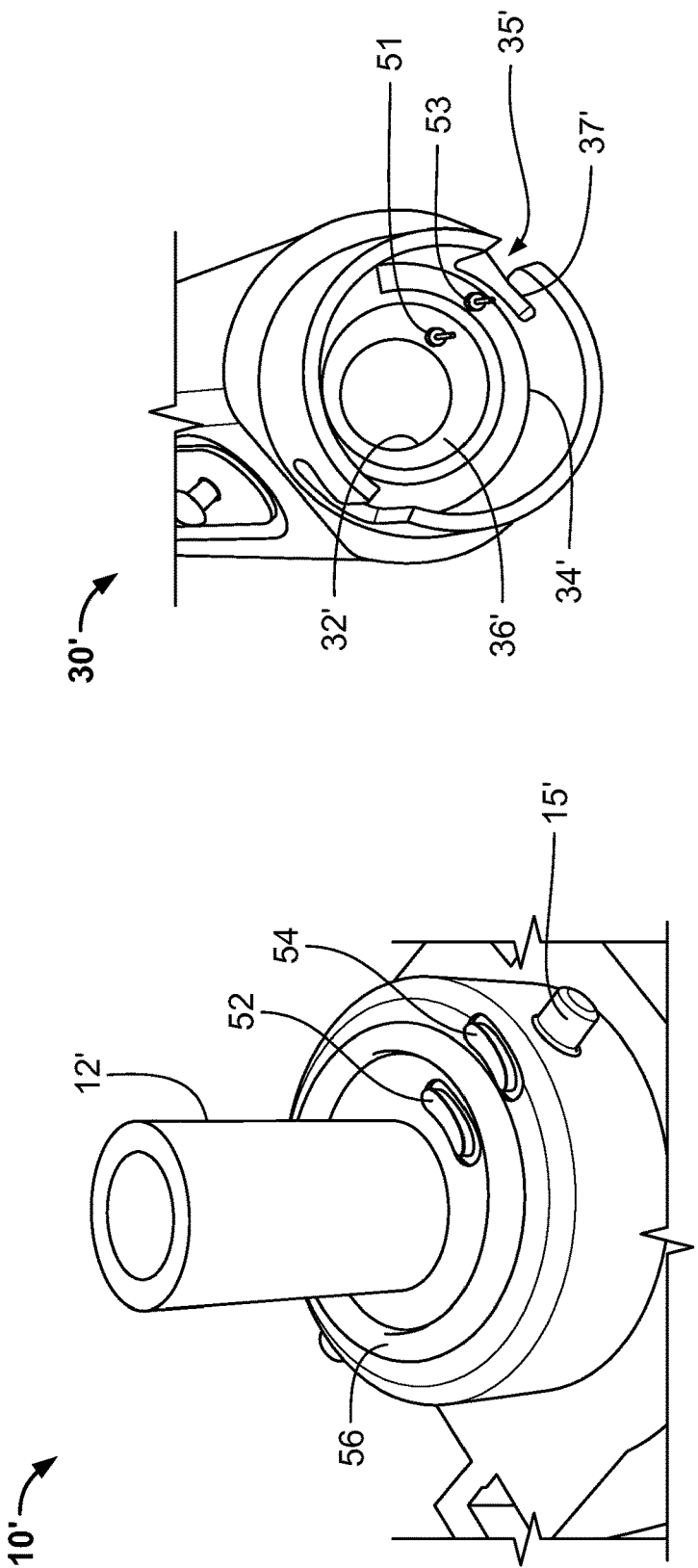

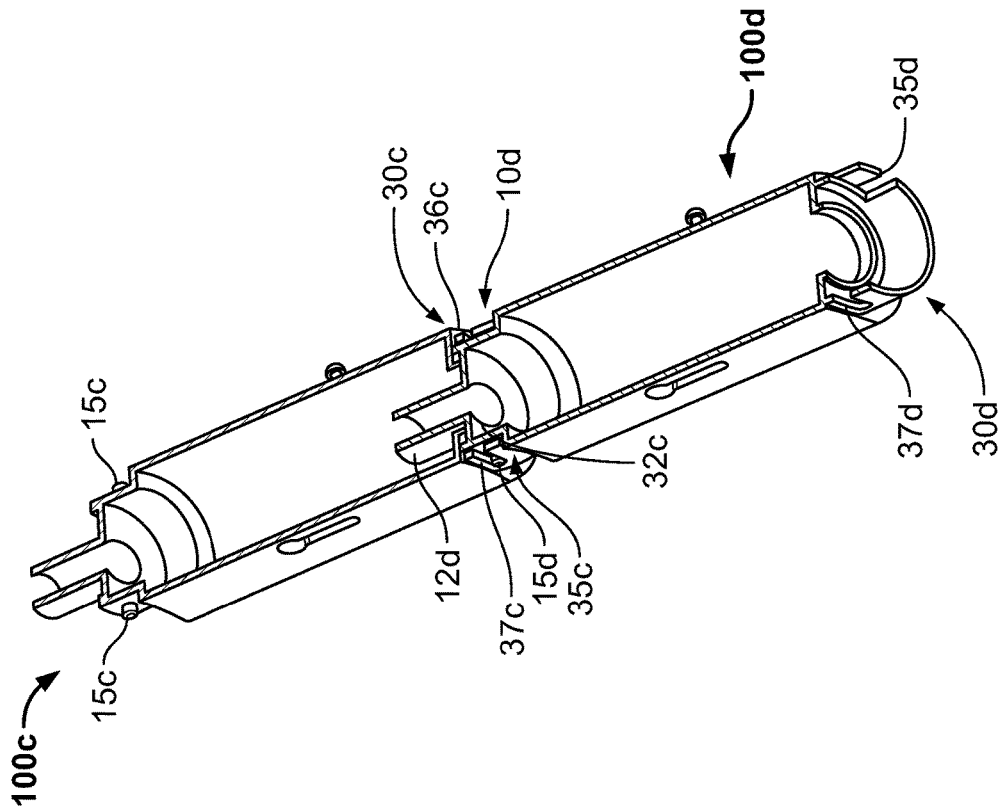
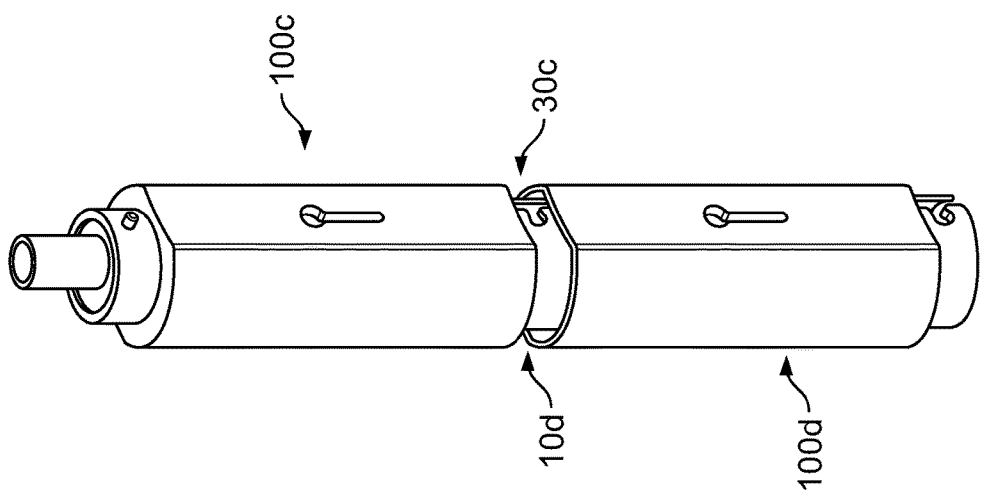
FIG. 4B
FIG. 4A

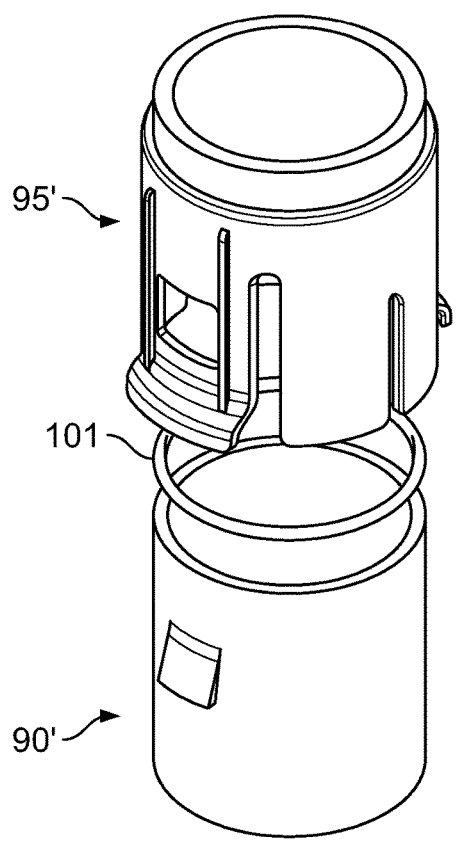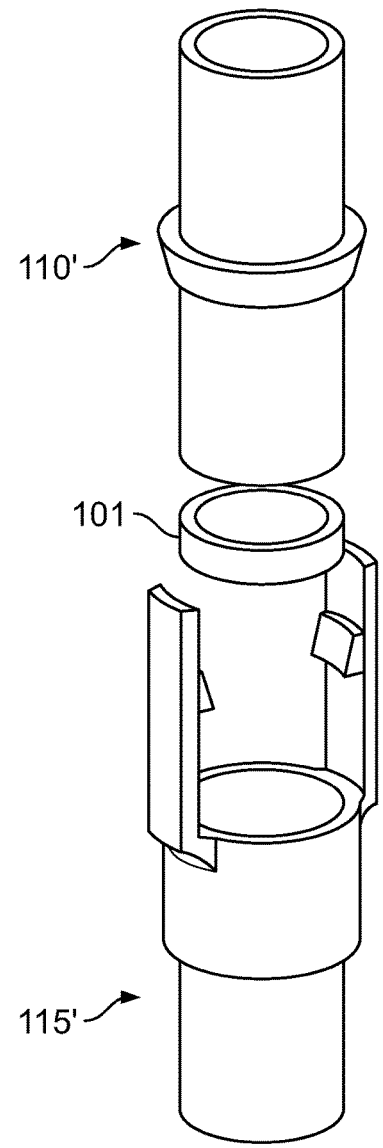
FIG. 6A
FIG. 6B

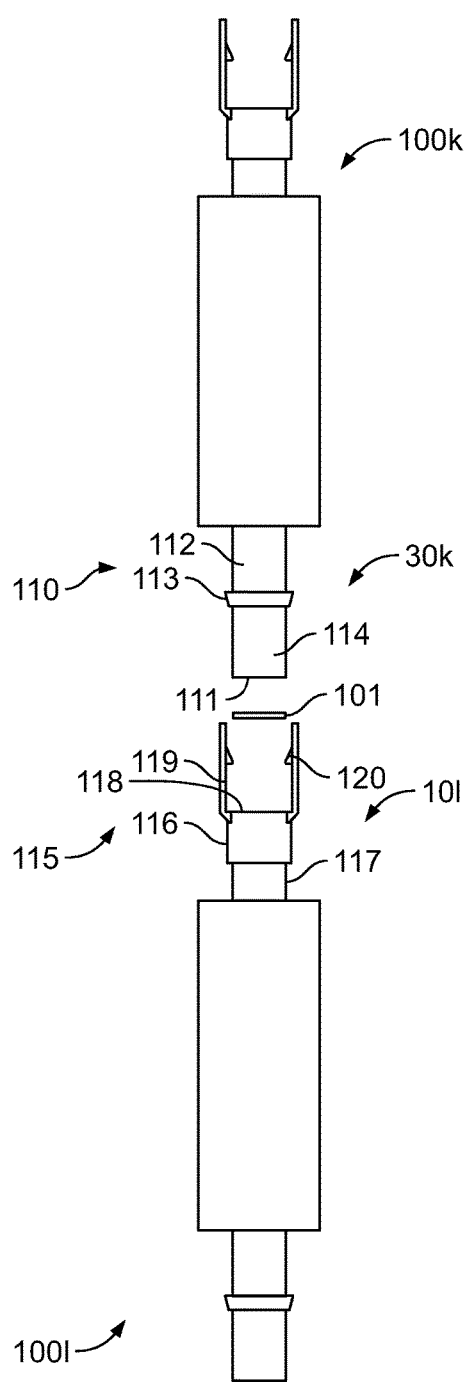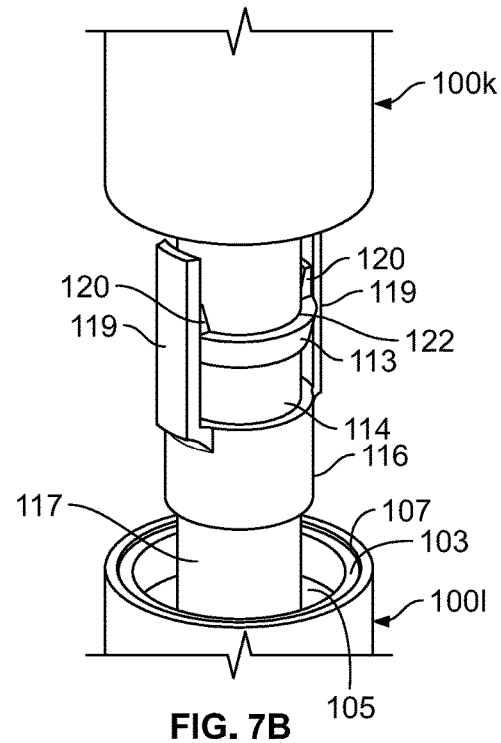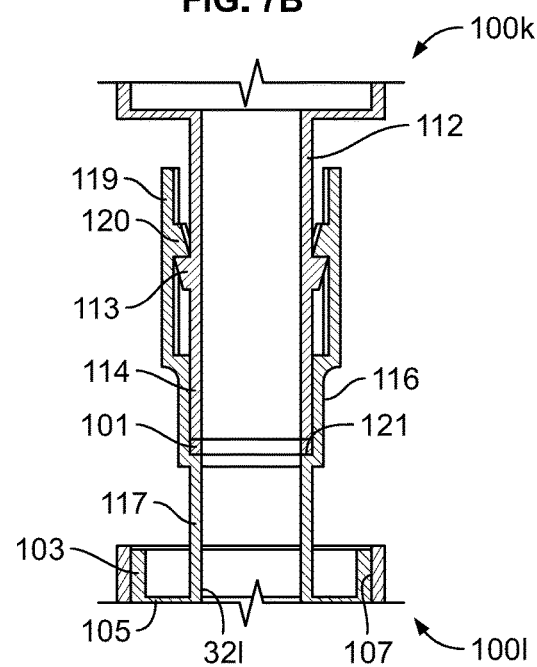
FIG. 7A
FIG. 7B
FIG. 7C

PORTABLE ALTERNATIVE-ENERGY POWERED PUMP ASSEMBLY

CROSS-REFERENCE TO RELATED APPLICATION

This application claims priority to and incorporates herein by reference in its entirety U.S. Provisional Patent Application No. 62/373,212, titled "Portable Alternative-Energy Powered Pump Assembly," filed Aug. 10, 2016.

FIELD OF THE INVENTION

Embodiments of the invention relate to systems for and methods of pumping a fluid and, more specifically, to a solar- or other alternative energy-powered portable and expandable pump assembly for providing water in remote areas.

BACKGROUND

Basic pump design requires two primary inputs: design head and fluid flow requirements. Based on these two inputs, practitioners may design a pump assembly that includes a pump and motor with sufficient power to raise a volume of fluid, e.g., water, to a desired height to satisfy both the design head and volumetric or fluid flow requirements. Often, the pump assembly is an electrically powered, off-the-shelf component.

Water is a valuable resource for raising crops, for raising animals, for cooking, for hygiene, and for human consumption. In many regions of the world, however, water is not readily accessible due to any of a number of factors that may include, for example, the depth to an aquifer or water table (which may change from time to time and from season to season), the cost of drilling and installing a well, the cost of a pump assembly to raise water to the Earth's surface, the cost and availability of electrical power for operating a pump motor or other device, and so forth.

SUMMARY

When conventional design information is not known in advance, design variables may change rapidly, e.g., due to a drought or other natural or man-made occurrence, and/or off-the-shelf pumps may not readily available. In such situations, smaller size pumps hydraulically connected in series may be used to provide greater head for pumping a fluid, while smaller capacity pumps hydraulically connected in parallel may be used to increase the volumetric or fluid flow rate. Thus, pump assemblies including pumps connected both in series and in parallel may provide a greater head capability and a greater fluid flow.

In those regions of the world in which water may otherwise be accessible to the inhabitants, it may be desirable to provide water to local inhabitants using a portable pumping system, e.g., a pump assembly that can be transported to any desired location and powered using solar power cells or other alternative-energy power-generating system. It may also be desirable to provide a portable pump assembly that includes pump housings that facilitate coupling a first pump housing to one or more additional pump housings to create, as necessary, a serial- and/or parallel-type configuration to address local needs (e.g., head, volumetric or fluid flow rate, and the like), as well as changes to those needs.

In a first aspect, embodiments of the invention generally relate to a pump. In some embodiments, the pump includes a pump housing that includes an inner chamber adapted to accommodate a pump, an inlet for drawing fluid into the pump, an outlet for expelling fluid from the pump, and an elongate outer casing surrounding the inner chamber. In some implementations, the outer casing includes first and second quick connects for coupling, in serial- and/or parallel-type configurations, a first pump housing to one or more additional pump housings. In some variations, the pump housing is adapted to couple to corresponding pump housings in a combined serial- and parallel-type configuration. The pump may further include a pump motor, e.g., an electric (DC) pump, a brushless (DC) pump, a rotary pump, a centrifugal pump, a submersible pump, an axial flow pump, a positive displacement pump, a reciprocating pump, and combinations thereof, disposed in the inner chamber.

In some implementations, the elongate outer casing is substantially cylindrical in shape, rectangular shaped, box-like, and/or substantially sector-shaped and/or includes opposing faces that are planar and/or arcuate. In some variations, the arcuate faces include convex and concave faces, such that a convex face of a first outer casing is couplable to a concave face of a second outer casing to provide the parallel-type configuration of pump assemblies.

In some implementations, the first quick connect may be attached or coupled to the outer casing of the pump housing and may be a sliding peg-slot connector, magnets of opposing polarity, a T-slot and nut connection, a flanged rail-slot connector, a dovetailed connection, a hollow conduit having protrusions on a sidewall thereof, and/or a hollow conduit having arms extending from a sidewall thereof. In some variations, the sliding peg is formed on a convex portion of the elongate outer casing and the slot connector is formed in a concave portion of the elongate outer casing and/or the slot connector forms a non-linear opening. In some applications, the first quick connect includes components located at opposing locations on the sidewall of the pump housing.

In some implementations, the second quick connect may be located at an end of the pump housing and may be a bayonet-type connection, magnets of opposing polarity, a screw-on type connection, a hollow conduit having a flexible clip including an aperture or opening on a sidewall thereof, and a hollow conduit having an annular ring and/or a disk on a sidewall thereof. In some variations, the bayonet-type connection is formed at an end of the outer casing and is couplable with a mating bayonet-type connection formed at an end of another outer casing to provide the serial-type configuration of pump assemblies. In some applications, the second quick connect includes components located at opposing ends of the pump housing.

In a particular embodiment, the first quick connect is disposed at the outlet, and the second quick connect is disposed at the inlet. In some implementations, the pump housing is configured for coupling to a second pump housing in a serial-type configuration using at least one of the quick connects.

In some applications, the first quick connect includes a sidewall defining a hollow conduit, a proximal end in fluid communication with the outlet of the pump housing, a distal end adapted to form fluid communication with and to be removably attachable to a second quick connect of a second pump housing, and protrusions located on the sidewall, each protrusion adapted to engage a corresponding opening located in a flexible clip of the second quick connect of the second pump housing. In some applications, the first quick connect may be fixedly attached to the outlet, incorporated into the outlet, and/or removably attachable to some portion of the pump housing proximate the outlet.

In some applications, the second quick connect includes a sidewall defining a hollow conduit, a distal end adapted to form fluid communication with and to be removably attachable to a first quick connect of a second pump housing, a proximal end in fluid communication with the inlet of the pump housing, and a flexible clip comprising openings configured for retaining a corresponding protrusion located on a sidewall of the first quick connect of the second pump housing. In some variations, the second quick connect is to fixedly attached to the inlet, incorporated into the inlet, and removably attachable to some portion of the pump housing proximate the inlet In still another application, the second quick connect includes a sidewall defining a hollow conduit, a proximal end in fluid communication with the outlet of the pump housing, a distal end adapted to form fluid communication with and to be removably attachable to a first quick connect of a second pump housing, and arms extending from the sidewall and including a corresponding protrusion adapted to engage an annular ring and/or a disk located on the first quick connect of the second pump housing. In a further application, the second quick connect may be fixedly attached to the outlet, incorporated into the outlet, and/or removably attachable to some portion of the pump housing proximate the outlet.

In another application, the first quick connect may include a sidewall defining a hollow conduit, a distal end adapted to form fluid communication with and to be removably attachable to a second quick connect of a second pump housing, and an annular ring and/or a disk configured to retain protrusions located on a corresponding arm of the second quick connect of the second pump housing. In a further application, the first quick connect may be fixedly attached to inlet of, incorporated into the inlet, and/or removably attachable to some portion of the pump housing proximate the inlet.

In some variations, the pump assembly includes a sealing device located between the first quick connect and the second quick connect.

BRIEF DESCRIPTION OF THE DRAWINGS

The foregoing features and advantages of embodiments of the invention will become more apparent from a reading of the following description in connection with the accompanying drawings, in which:

FIGS. 1B and 10 show perspective views of opposite sides of a box-shaped pump assembly having sliding L-shaped connections in accordance with some embodiments of the present invention;

FIG. 3A shows a perspective view of electrical isolation for an upper connection portion of a pump assembly for a serial-type configuration in accordance with some embodiments of the present invention;

FIG. 3B shows a perspective view of electrical isolation for a lower connection portion of a pump assembly for a serial-type configuration in accordance with other embodiments of the present invention;

FIG. 4A shows a front perspective view of two pump assemblies hydraulically coupled in series in accordance with some embodiments of the present invention;

FIG. 4B shows a cross-section perspective view of the two pump assemblies of FIG. 4A hydraulically coupled in series in accordance with some embodiments of the present invention;

FIG. 6A shows an exploded perspective view of individual/replacement first and second quick connects in accordance with some embodiments of the present invention;

FIG. 6B shows an exploded perspective view of alternative individual/replacement first and second quick connects in accordance with some embodiments of the present invention;

FIG. 7A shows an exploded side view of upper and lower pump housing having alternative first and second quick connects in accordance with some embodiments of the present invention;

FIG. 7B shows a perspective view of the alternative first and second quick connects of FIG. 7A in accordance with some embodiments of the present invention;

FIG. 7C shows a cross-sectional view of the alternative first and second quick connects of FIG. 7B in accordance with some embodiments of the present invention;

DETAILED DESCRIPTION

Figure 1B:
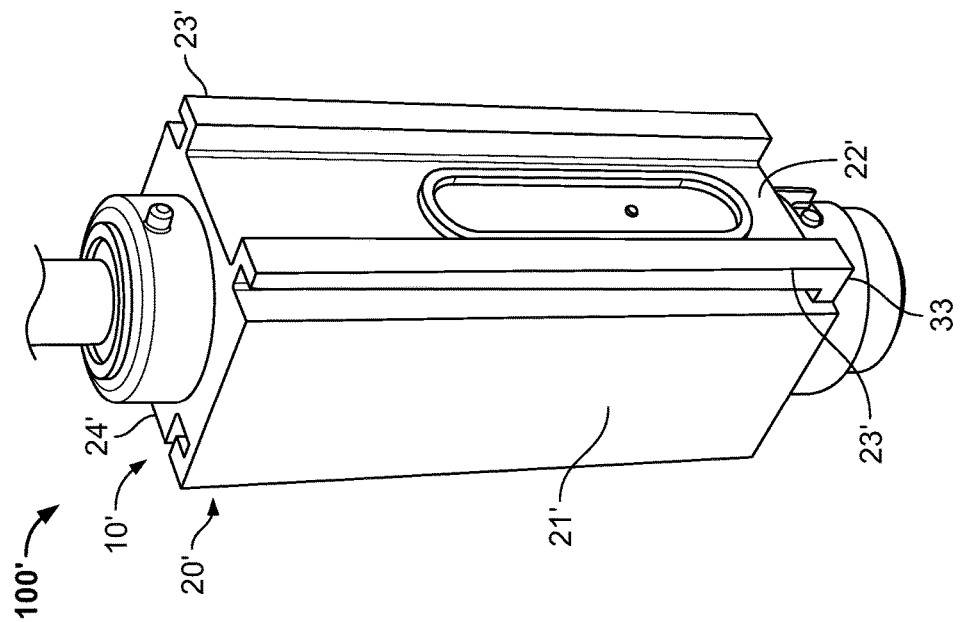

Pump assemblies 100, 100' in accordance with some embodiments of the present invention are shown in FIGS. 1A through 10. In some embodiments, the pump assembly 100 includes an upper connection portion 10 (that provides an outlet for expelling fluid from the pump assembly 100), an intervening housing portion 20 (providing an outer casing and an inner chamber), and a lower connection portion 30 (that provides an inlet for drawing fluid into the pump assembly 100). In some variations, the pump assembly 100 is manufactured from materials such as, for the purpose of illustration and not limitation, metal, metal alloy, hard plastic, or combinations thereof. Advantageously, the upper and lower connection portions 10, 30 may be adapted to enable users to couple operatively and quickly one pump assembly 100 to one or more other pump assemblies 100 in a serial-type configuration to provide greater pumping pressure head, while the housing portion 20 may be adapted to enable users to couple operatively and quickly one or more other pump assemblies 100 in a parallel-type configuration to provide great fluid flow.

Pump Assembly

In some embodiments, the upper connection portion 10 includes a first hollow or substantially hollow portion (e.g., an annular tube or ring) 12 and a second hollow or substantially hollow portion (e.g., an annular tube or ring) 14 that are fixedly attached to each other, such that the hollow portions of the first annular ring 12 and of the second annular ring 14 are hydraulically coupled to provide an outlet for expelling fluid from the inner chamber of the housing portion 20. Although the drawings show each of the hollow portions 12, 14 making up the upper connection (or outlet) portion 10 as cylindrical in shape externally, the invention is not to be construed as being limited thereto. For example, the shapes of the first and second hollow portions 12, 14 may also be triangular, rectangular, polyhedral, trapezoidal, oval, or the like.

When, as shown, the first and second hollow portions 12, 14 are cylindrical in shape, in some variations, the cylindrical hollow portions 12, 14 may be fixedly attached to each other coaxially, such that the first hollow portion 12 is attached (e.g., welded, adhered, bonded, or the like) to a top portion, e.g., a circumferential ring 13, of the second hollow portion 14. The circumferential ring 13 may be configured (e.g., stepped) to accept and retain a sealing device, e.g., an O-ring, a gasket, a washer, or the like, for the purpose of providing a watertight, or substantially watertight, seal about the first hollow portion 12 of the upper connection portion 10 when the first hollow portion 12 is operatively inserted into an opening in the lower connection portion 30 of another pump assembly 100. Optionally, or additionally, a peripheral surface of the first hollow portion 12 may include one or more grooves adapted to accommodate a coaxially mounted sealing device, e.g., an O-ring, for the purpose of providing a watertight, or substantially watertight, seal about the first hollow portion 12 of the upper connection portion 10 when the first hollow portion 12 is operatively inserted into an opening in the lower connection portion 30 of another pump assembly 100. In an optional embodiment, rather than being fixedly attached, each of the first and second hollow portions 12, 14 may include a set of corresponding threadings for removably screwing the first hollow portion 12 into the second hollow portion 14, or vice versa. Alternatively, portions 12, 14 may be integrally formed as a single component.

Quick connect/disconnect devices 15 may be formed on or attached to an outer, peripheral surface 16 of the second hollow portion 14. The quick connect/disconnect devices 15 are formed or attached to the peripheral surface 16 in pairs, diametrically opposing one another or at some angle other than 180 degrees, to provide a particular circumferential registration with a mating pump assembly 100. Although FIG. 1A shows a single pair of quick connect/disconnect devices 15, this is done for illustrative purposes only. Any number of pairs of quick connect/disconnect devices 15 may be formed or attached to the peripheral surface 16 of the second hollow portion 14.

Exemplary quick connect/disconnect devices 15 can include, for the purpose of illustration and not limitation, either portion of a bayonet-type connection or bayonet mount, magnets of opposing polarity, a sliding peg-slot connector connection, a screw-on type threaded connection, or the like. Those skilled in the art can appreciate that a pair of quick connects/disconnects does not imply that each quick connect/disconnect is the same as the other connecting device. For example, a bayonet mount protrusion, pin, or catch 15 may be formed or attached on one portion of the peripheral surface 16 of the second hollow portion 14 and, paired with a second protrusion, pin, or catch 15 or with a receiving socket 35 having a substantially L-shaped slot 37 at another location on the peripheral surface 16 of the second hollow portion 14.

The pump housing 20 is operatively and fixedly connected to the upper connection (or outlet) portion 10 at a distal end and to the lower connection (or inlet) portion 30 at a proximal end. In some embodiments, the pump housing 20 includes an elongate hollow shell or outer casing that is adapted to provide a watertight, or substantially watertight, plenum or inner chamber 25 for accommodating the pump components (e.g., pump, pump motor, electrical wiring, and the like). The pump housing 20 may be configured as a single shell that provides protection from exterior loads as well as a pressurized inner chamber 25 or plenum. Alternatively, the pump housing 20 may be configured with multiple shells, e.g., double shelled, that include, for example, an inner, pressurized shell for accommodating the pump components (e.g., pump, pump motor, electrical wiring, and the like) and an outer shell for external protection.

The pump housing 20 may take on any shape to facilitate installation of the pump housing 20 in a borehole, if required, and/or for quickly attaching and detaching two or more pump assemblies 100 in a parallel-type configuration, as shown in FIGS. 2A through 2D. Although FIGS. 2A through 2D show pump assemblies 100 with substantially cylindrical pump housings 20, this is done for illustrative purposes only. For example, instead of being substantially cylindrical, each of the pump housings 20 may be substantially rectangular or box-shaped (FIGS. 1B and 1C) or, in plan view, resemble a geometric sector (FIG. 1D).

The pump housing 20 may be substantially cylindrical as shown in FIG. 1A and FIGS. 2A through 2D, such that the pump housing 20 includes a peripheral sidewall 21 having opposing planar faces 22, 24 that are adapted to quickly attach and detach pump assemblies 100 in a parallel-type configuration, while preventing rotation around the connecting mechanism. The faces 22, 24 may be of other geometries, such as contoured, concave, convex, and the like. An exemplary quick connect/disconnect (shown in FIG. 1A and FIGS. 2A through 2D) may include a sliding peg and slot connector device in which a slidable peg 26 with an enlarged head may be formed or attached to the one face 22 of the pump housing 20, while a slot connector 28 having an oversized opening 29 capable of receiving the enlarged head of the slidable peg 26 may be formed in the other face 24 of the pump housing 20. Although the opening of the slot connector 28 shown in the drawings is substantially linear, those skilled in the art can appreciate that slot connectors 28 having a non-linear (e.g., curved) track may also be used.

Figure 1A:
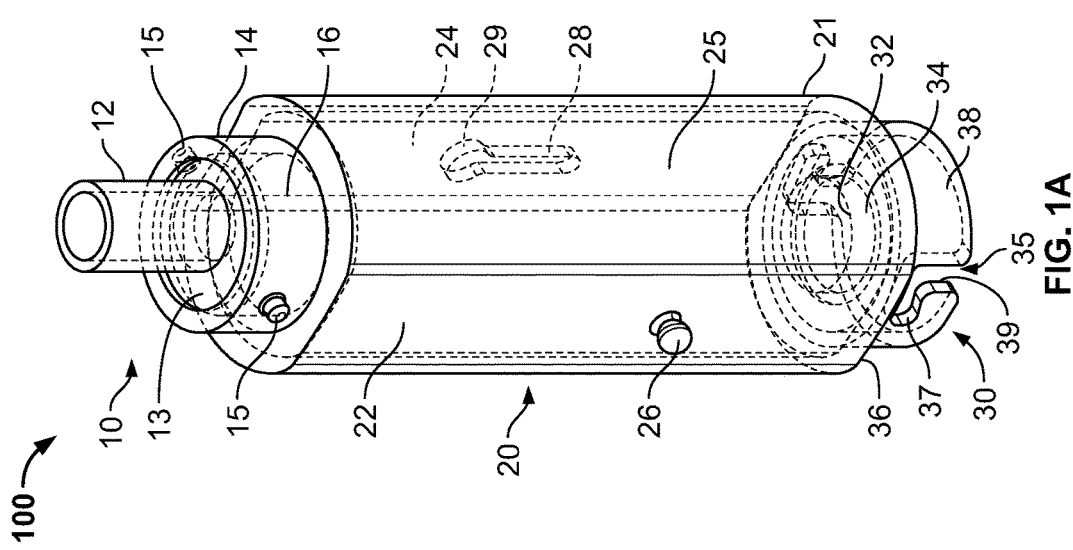
FIG. 1A shows a perspective view of a pump assembly in accordance with some embodiments of the present invention.
Figure 1C:
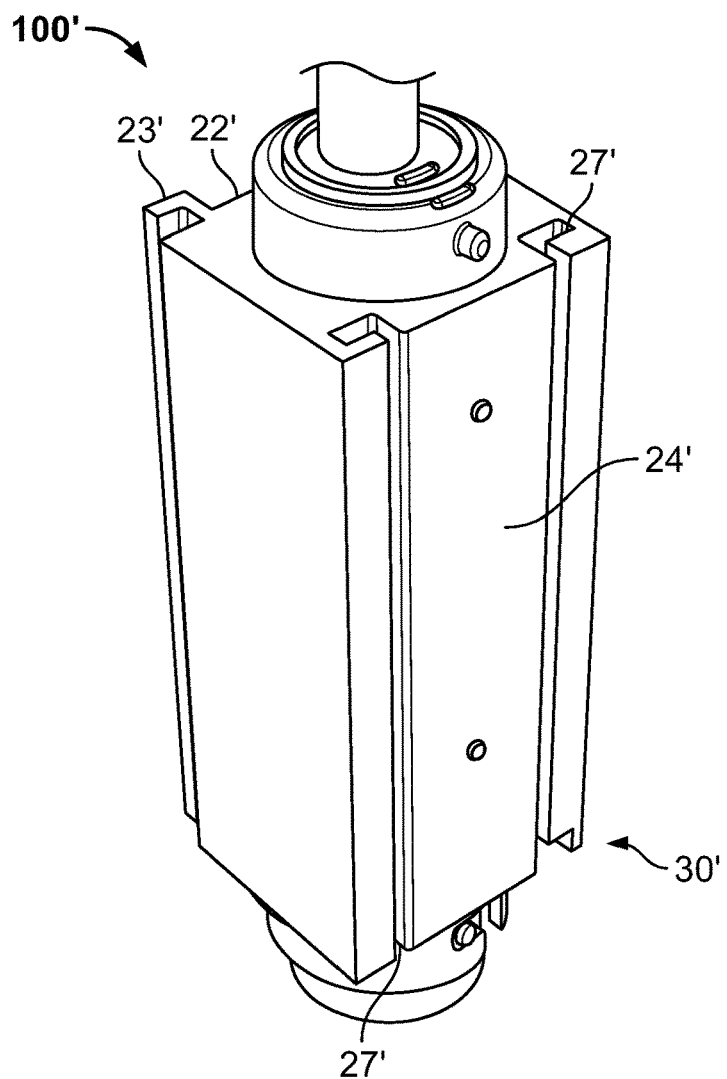
Figure 1D:
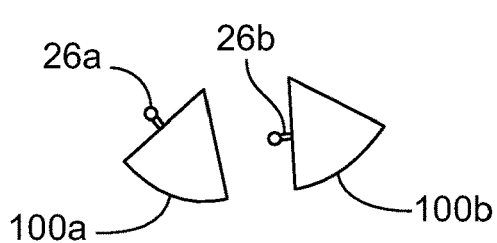
FIG. 1D shows a plan view of sector-shaped pump assemblies in accordance with some embodiments of the present invention.
Figure 1E:
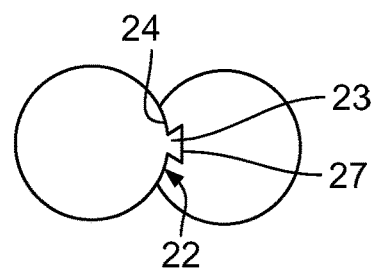
FIG. 1E shows a plan view of two pump assemblies having dovetailed connections in accordance with some embodiments of the present invention.

As shown in FIGS. 1B and 10, in yet another embodiment, the pump housing 20' may be substantially rectangular- or box-shaped. In some applications, the pump housing 20' may include a plurality, e.g., four, adjoining sidewalls 21'. In some implementations, diametrically opposing first sidewall 22' and second sidewall faces 24' may be adapted to quickly attach and detach pump assemblies 100' in parallel, while preventing rotation around the connection mechanism. An exemplary connecting mechanism for the rectangular- or box-shaped pump housing 20' in FIGS. 1B and 10 may include a pair of, e.g., L-shaped (male) flange connections 23' formed on or attached to the first sidewall face 22' of the pump housing 20' and a corresponding pair of, e.g., L-shaped, receiving (female) slot connections 27' formed in or provided on the second sidewall face 24' of the pump housing 20'. In some variations, the male flange connection 23' may extend an entire longitudinal length of the sidewall face 22' or, alternatively, any portion thereof. Similarly, the female slot connection 27' can extend an entire longitudinal length of the sidewall face 24' or, alternatively, any portion thereof. In some variations, each of the male flange 23' and female slot connections 27' is slightly tapered from the upper connection portion 10' to the lower connection portion 30' to ensure a snug fit when the pair of male flange connections 23' is introduced into respective female slot connections 27' at the upper connection portion 10' end of the pump assembly 100' and translated to the lower connection portion 30' end. Optionally, a stop 33 may be provided at a lower end of one or more of the female slot connections 27' to arrest further translation of the male flange connection(s) 23'.

Alternatively, in another embodiment, the connection may be a dovetailed connection (FIG. 1E), including a dovetailed (male) portion 23 formed on or attached to the convex face 22 of the pump housing 20 in combination with a slot or socket (female) portion 27 formed in the concave face 24 of the pump housing 20, for receiving the dovetailed male portion 23. In some variations, the dovetailed (male) portion 23 can extend an entire longitudinal length of one face of the pump housing 20 or, alternatively, any portion thereof. Similarly, the slot or socket (female) portion 27 can extend an entire longitudinal length of the other face of the pump housing 20 or, alternatively, any portion thereof. Further exemplary embodiments of quick connects/disconnects can include providing respective portions of a hook and loop connection device on faces, providing magnets of opposing polarity on opposing faces, and/or providing a T-slot and nut-type connection on opposing faces.

In some implementations, the lower connection portion 30 forms an opening 32 that is dimensioned to accommodate and provide a watertight, or substantially watertight, seal around a conduit and/or the first hollow portion 12 of the upper connection portion 10 of a second pump housing attached serially to a first pump housing. In some implementations, an annular ring 34 is formed about the circumference of the opening 32 on a planar portion 36 of the lower connection portion 30. In some variations, the outer dimension of the annular ring 34 is dimensioned to fit into the circumferential ring 13 of the second hollow portion 14 of the upper connection portion 10 of a second pump housing attached serially to a first pump housing. The annular ring 34 may be further configured to engage a sealing device, e.g., an O-ring, a gasket, a washer, or the like, disposed in the circumferential ring 13, providing a watertight, or substantially watertight, seal about the first hollow portion 12 of the upper connection portion 10 of a second pump housing attached serially to a first pump housing when the first hollow portion 12 is operatively inserted into the opening 32 in the lower connection portion 30 of the first pump housing. Serial connections between pump assemblies are discussed in greater detail below.

In some embodiments, an annular wall 38 extends axially from the planar portion 36 of the lower connection portion 30. An inner dimension of the annular wall 38, e.g., an inner diameter, may be sized to accommodate an outer dimension (e.g. an outer diameter) of a second hollow portion 14, of a second pump housing attached serially to a first pump housing to provide a reliable, sliding fit between an interior surface 39 of the annular wall of a second pump housing and the peripheral surface 16 of the second hollow portion 14 of a first pump housing, when the first hollow portion 12 of a first pump housing is operatively engaged in the opening 32 of the lower connection portion 30 of a second pump housing.

Quick connect/disconnect devices 35 may be formed in the annular wall 38 of the lower connection portion 30. The quick connect/disconnect devices 35 are formed in pairs and configured to mate with corresponding connect/disconnect devices 15 of the upper connection portion 10 of a second pump housing. Although FIG. 1A shows a single pair of quick connect/disconnect devices 35, this is done for illustrative purposes only. Any number of quick connect/disconnect devices 35 may be formed in the annular wall 38 of the lower connection portion 30.

Exemplary quick connect/disconnect devices 35 can include, for the purpose of illustration and not limitation, either portion of a bayonet-type connection or bayonet mount, magnets of opposing polarity, a screw-on type threaded connection, or the like. Those skilled in the art can appreciate that a pair of quick connects/disconnects does not imply that each quick connect/disconnect is the same as the other connect/disconnect. For example, a bayonet mount protrusion, pin, or catch 15 may be formed or attached on one portion of the annular wall 38 of the lower connection portion 30 and paired with a bayonet mount receiving socket 35 having a substantially L-shaped slot 37 at another (e.g., diametrically opposing) location on the annular wall 38 of the lower connection portion 30.

Figure 3E:
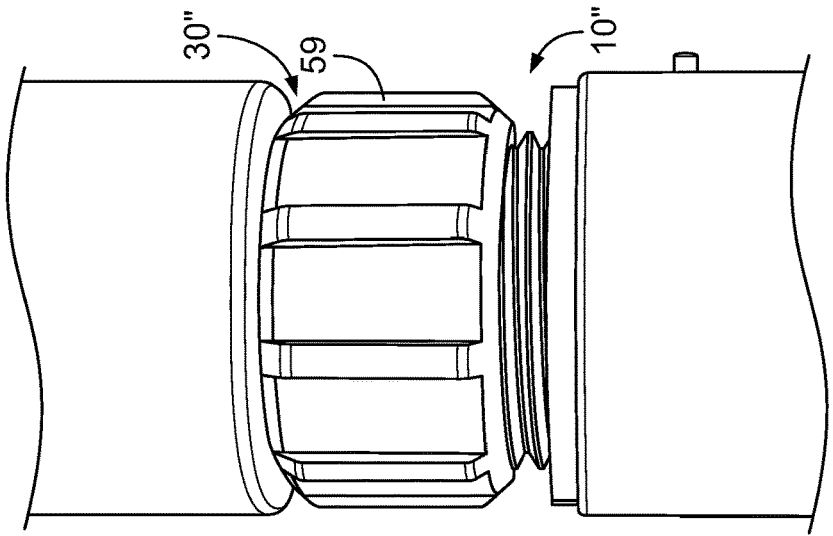
FIG. 3E shows a perspective view of the upper connection portion of FIG. 3C mechanically, hydraulically, and electrically coupled to the lower connection portion of FIG. 3D in accordance with some embodiments of the present invention.
Figure 3D:
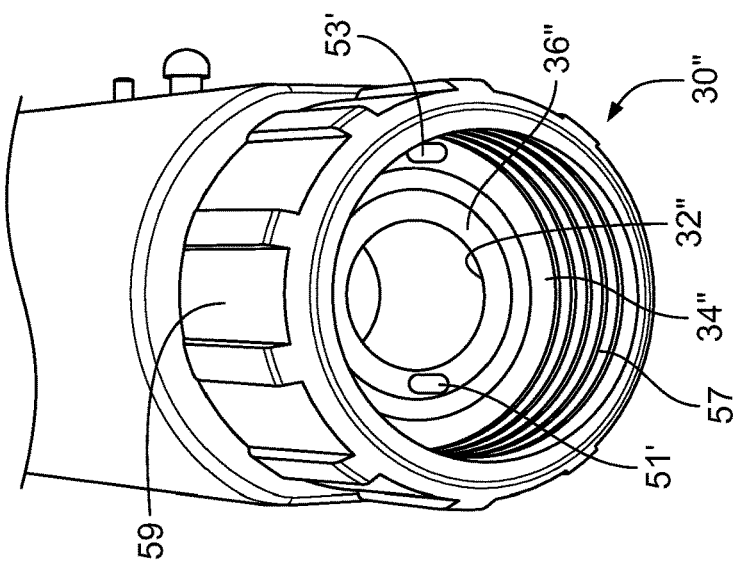
FIG. 3D shows a perspective view of electrical isolation for a lower connection portion of a pump assembly for a serial-type configuration in accordance with some embodiments of the present invention.
Figure 3C:
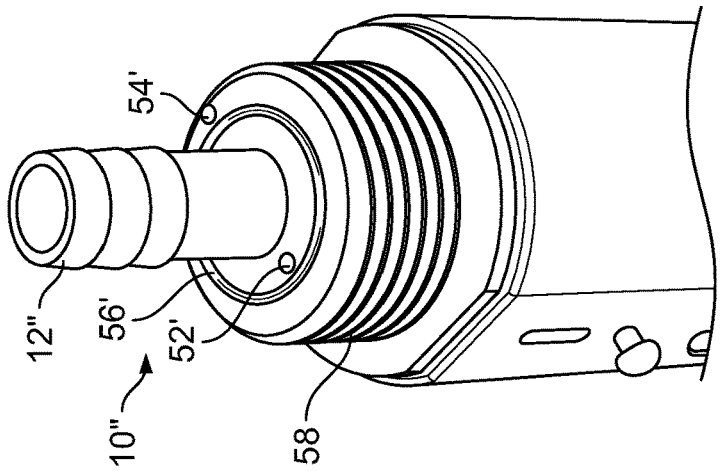
FIG. 3C shows a perspective view of electrical isolation for an upper connection portion of a pump assembly for a serial-type configuration in accordance with some embodiments of the present invention.

As shown in FIGS. 3C through 3E and discussed in more detail below, the upper connection portion 10" and lower connection portion 30" may be mechanically, electrically, and hydraulically coupled using a screw-on type threaded connection. For example, in some embodiments, threadings 58 may be formed on the upper connection portion 10" and a threaded, screw-on cap 59 may be rotatably attached to the lower connection portion 30" of each pump assembly 100. In some variations, the screw-on cap 59 includes, on a peripheral surface, one or more ridges, flats, or protrusions to facilitate gripping and turning the cap 59, e.g., by hand or using a wrench. In one implementation, an annular, e.g., L-shaped, flange for holding the cap 59 at the lower connection portion 30" may be fixedly attached to the pump housing 20, e.g., at planar surface 36".

Parallel-Type Configurations

Advantageously, as previously mentioned, the pump assemblies 100 and quick connects/disconnects 15, 35 of embodiments of the present invention allow quickly connecting or assembling a number of pump assemblies 100 to provide greater head and/or greater volumetric or fluid flow. Referring to FIGS. 2A through 2D, a pair of pump assemblies 100a, 100b are shown structurally joined in parallel to provide greater fluid flow. In the exemplary configuration, the connection mechanism for connecting the pair of pump assemblies 100a, 100b in parallel includes a sliding peg and slot connector arrangement formed, respectively, on opposing faces 22a, 24b of the pump housings. Those skilled in the art can appreciate, however, that the connection mechanism may include, instead, a dovetailed configuration, a magnetic connection, a hook and loop connection, and the like.

Figure 2A:
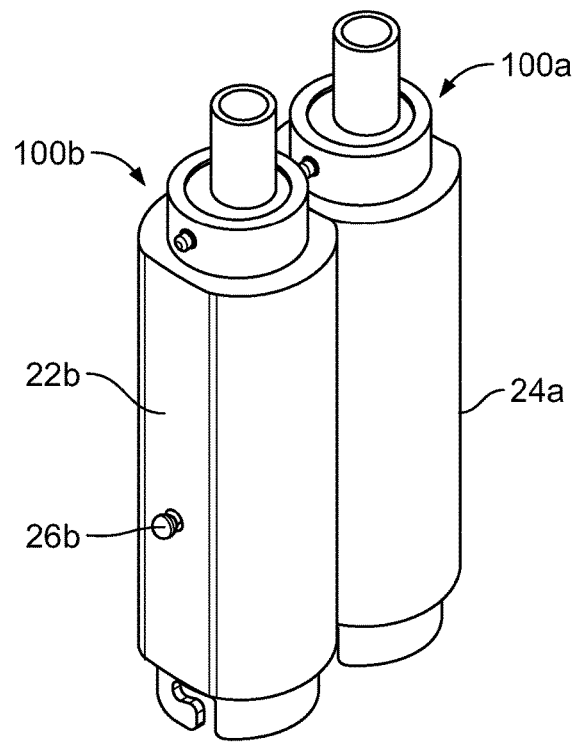
FIG. 2A shows a front perspective view of two pump assemblies hydraulically coupled in parallel in accordance with some embodiments of the present invention.
Figure 2B:
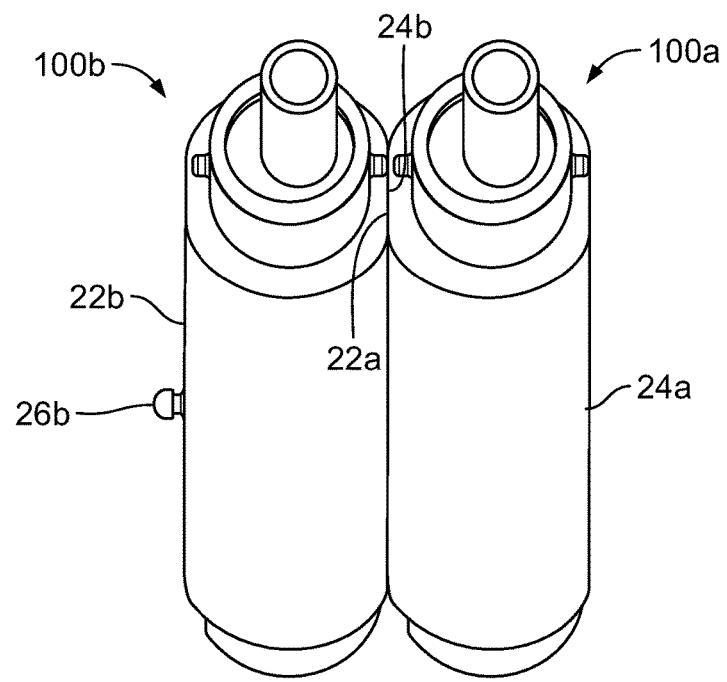
FIG. 2B shows a side perspective view of the two pump assemblies of FIG. 2A hydraulically coupled in parallel in accordance with some embodiments of the present invention.
Figure 2C:
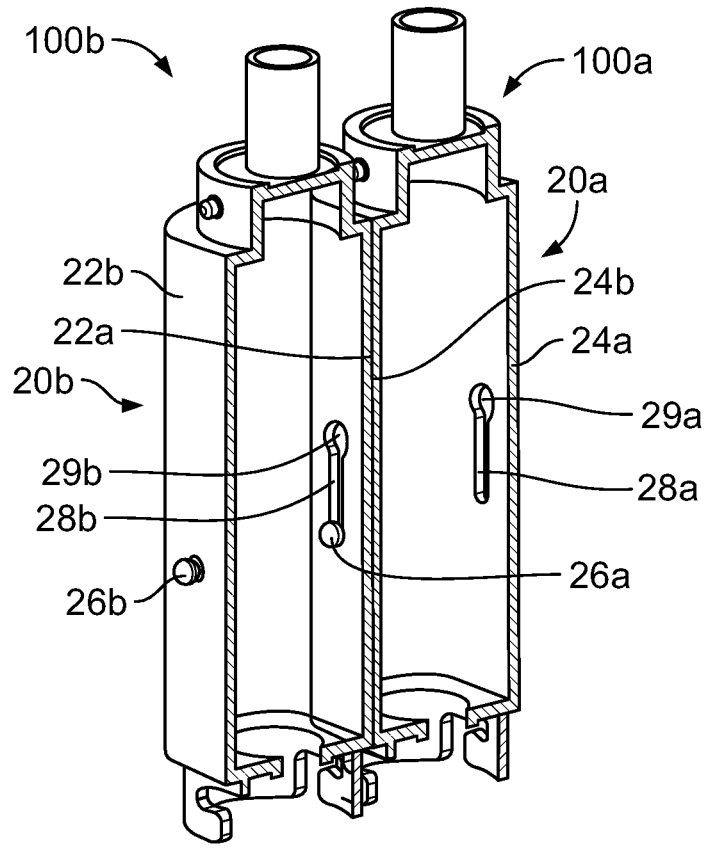
FIG. 2C shows a cross-section perspective view of the two pump assemblies of FIG. 2A hydraulically coupled in parallel in accordance with some embodiments of the present invention.
Figure 2D:
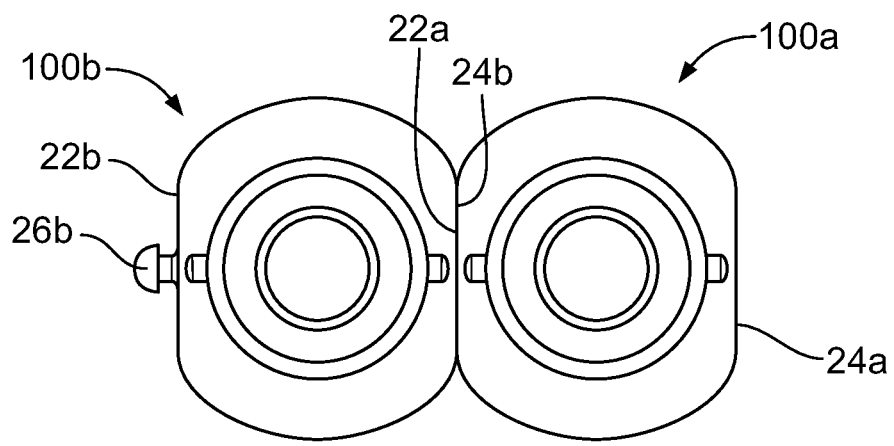
FIG. 2D shows a top (plan) view of the two pump assemblies of FIG. 2A hydraulically coupled in parallel in accordance with some embodiments of the present invention.

As shown in FIGS. 2C and 2D, a convex face 22a formed on the pump housing 20a of a first pump assembly 100a mates with the concave face 24b formed in the pump housing 20b of a second pump assembly 100b. More specifically, as shown in FIG. 2C, when the connection mechanism is a sliding peg and slot connector arrangement, the sliding peg 26a of the first pump assembly 100a may be inserted into the oversized opening 29b in the slot connector 28b of the second pump assembly 100b. Once the two pump housings 20a, 20b are properly positioned, the sliding peg 26a may be translated in a direction away from the oversized opening 29b. In some variations, the slot dimension (e.g., width) of the slot connector 28b is slightly less than the post dimension of the sliding peg 26a to provide a slight interference friction fit between the inner surface of the slot connector 28b and the peripheral surface of the post of the sliding peg 26a.

Advantageously, the non-planar surfaces of the concave face 24b of the second pump assembly 100b and convex face 22a of the first pump assembly 100a prevent the pump assemblies 100a, 100b from rotating about the sliding peg 26a. Alternatively, two or more pairs of mating pegs and slots can be used to prevent relative rotation of the mating housings. When more than two pump assemblies are joined in parallel, to avoid a substantially linear (in plane) arrangement of the pump assemblies 100a, 100b (FIG. 2D), in some variations, the non-planar surfaces of the concave 24b and convex faces 22a of the sidewall of the corresponding pump housings 20d, 20a and/or the orientation of the sliding peg 26a may be configured to allow a non-linear (in plane), e.g., curvilinear, arrangement of the adjacent pump assemblies 100b, 100a. Such a configuration can be used to provide an arrangement of parallel pumps that forms all or some portion of a circle.

Connection Manifold for Parallel-Type Configurations

In some implementations, when multiple pump assemblies are mechanically coupled in a parallel-type configuration, connection manifolds may be hydraulically coupled to the inlets (e.g., the first hollow portions of the upper connection portion) and/or the outlets (e.g., the openings of the lower connection portion) of the parallel pump assemblies, so that the fluid is drawn into the parallel pump assemblies through a common inlet and expelled from the parallel pump assemblies from a common outlet. Those of ordinary skill in the art can appreciate that the components of the connection manifold described in connection with the expelling or delivery end of the pump assembly may be essentially the same as those used for a connection manifold at the inlet end of the pump assembly.

Figure 2E:
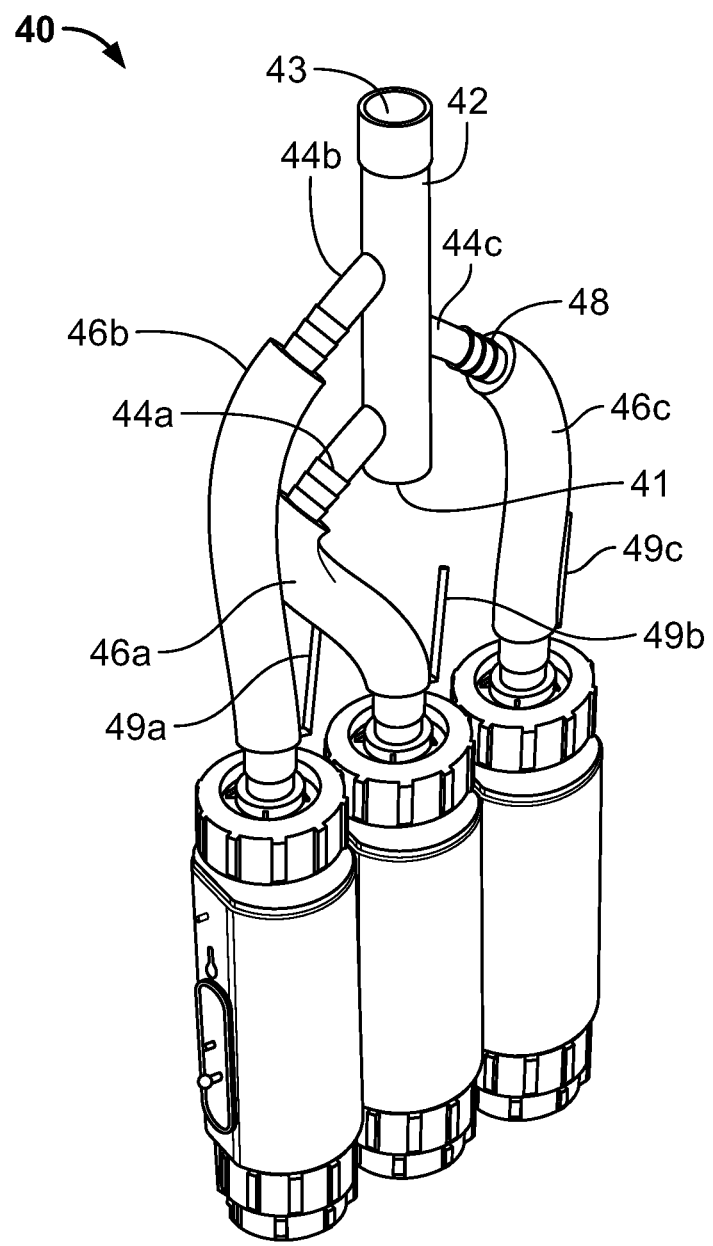
FIG. 2E shows a side perspective view of a connection manifold for three pump assemblies in a parallel-type configuration in accordance with some embodiments of the present invention.

FIG. 2E shows an illustrative embodiment of a connection manifold 40 for a parallel-type configuration. In some variations, the connection manifold 40 includes a substantially cylindrical, hollow trunk union piece 42 that is closed at a first (proximal) end 41 and that has an opening 43 at a second (distal) end. In between the first end 41 and the opening 43 are a number of substantially cylindrical, hollow branch conduits 44a, 44b, 44c that are in fluid communication with the inner (hollow) portion and the opening 43 of the trunk union piece 42. Although FIG. 2E shows three branch conduits 44a, 44b, 44c joining the trunk union piece 42, this is done for illustrative purposes only. Those of ordinary skill in the art can appreciate that any number of hollow branch conduits may be formed in or with the trunk union piece 42.

In some applications, a flexible conduit 46a, 46b, 46c may be removably and hydraulically attached, such that, for example, a first end of each a flexible conduit 46a, 46b, 46c is hydraulically coupled to a respective first hollow portion of the upper connection portions of pump assemblies in a parallel-type configuration and, a second end of each flexible conduit 46a, 46b, 46c is hydraulically coupled to a respective branch conduit 44a, 44b, 44c of the trunk union piece 42. The connection at the first hollow portion can include a tight interference fit, a clamp, threadings, and the like. To provide a better, watertight seal between the flexible conduits 46a, 46b, 46c and the branch conduits 44a, 44b, 44c, a series of (e.g., triangular) annular ridges or rings 48 may be formed about and proximate the opening of each of the branch conduits 44a, 44b, 44c. For reasons that will be discussed in greater detail below, with this arrangement, separate electrical leads or connections 49a, 49b, 49c may be provided for each pump assembly in the parallel-type configuration.

Advantageously, in one variation, the trunk union piece 42 may itself be an agglomeration of a number of individual (e.g., T-shaped or Y-shaped) portions that fit into one another to form the trunk union piece 42 in a modular manner. For example, each individual portion making up the assembled trunk union piece 42 can be slightly tapered at or near a (distal) opening end 43, such that the tapered opening end 43 of one of the individual pieces may be inserted into a (proximal) selectively closable end 41. Alternatively, each of the opening end 43 and closable end 41 may be threaded, such that the opening end 43 may be screwed into the closable end. Insertion of the opening end 43 into the selectively closeable end 41 may provide a tight interference or friction fit between the two adjoining individual portions. An end plug may be inserted, e.g., press fitted, screwed, or the like, into the hollow portion of one of the selectively closable ends 41 to provide a watertight, or substantially watertight, seal at that end 41.

In another implementation, instead of using a trunk union piece 42 in combination with flexible conduits 46a, 46b, 46c, a more rigid union piece of pre-established dimension and size and having a fixed number of openings, e.g., two pump, three pump, or four pump versions, for mechanically and hydraulically coupling to a fixed number of first hollow portions 12 of upper connection portions 10 of a number of pump assemblies 100 in a parallel-type configuration may be used.

Unlike the trunk union piece 42 with flexible conduits 46a, 46b, 46c, the more rigid union piece can avoid having to provide separate electrical leads or connections. Instead, advantageously, the more rigid union piece may include, as part of the rigid union piece, integrated electrical connections to electrically couple each of the pump assemblies 100.

A similar or substantially similar connection manifold may be hydraulically coupled to each of the inlets or openings 32 at the lower connection portion 30 of a number of pump assemblies 100 mechanically connected in a parallel-type configuration. In one embodiment, the trunk union piece, conduits, and flexible conduits can be essentially the same as those described above in connection with the outlet assembly manifold. For example, the connection manifold can include a substantially cylindrical, hollow trunk union piece that is closed at a first (proximal) end and that has an opening at a second (distal) end. In between the first end and the opening can be a number of substantially cylindrical, hollow conduits that are in fluid communication with the inner (hollow) portion and the opening of the trunk union piece. Advantageously, in one variation, the trunk union piece may itself be an agglomeration of a number of individual (e.g., T-shaped or Y-shaped) portions that fit into one another to form the trunk union piece in a modular manner. For example, each individual portion making up the assembled trunk union piece can be slightly tapered at or near a (distal) opening end, such that the tapered opening end of one of the individual pieces may be inserted into a (proximal) selectively closable end of a second individual piece. Insertion of the opening end of a first individual piece into the selectively closeable end of a second individual piece provides a tight interference or friction fit between the two adjoining individual portions. Alternatively, each of the opening end and closable end may be threaded, such that the opening end may be screwed into the closable end. An end plug may be inserted, e.g., press fitted, screwed, or the like, into the hollow portion of one of the selectively closable ends to provide a watertight, or substantially watertight, seal at that end.

In some applications, each flexible conduit may be removably and hydraulically attached (e.g., at a first end) to a respective conduit of the trunk union piece. To provide a better, watertight seal between the flexible conduit and the conduit of the trunk union piece, a series of (e.g., triangular) annular ridges or rings may be formed about and proximate the opening of each of the conduits to the trunk union piece. The second end of each flexible conduit can, for example, include a hollow connection device, or be removably attached to a hollow connection device, that is adapted to be mechanically and hydraulically coupled to the lower portion 30 of the pump assembly 100, to provide a watertight, or substantially watertight, seal at the opening in the lower portion 30 of the pump assembly 100 or, alternatively, about a filter (discussed below) that itself is mechanically and hydraulically coupled to the lower portion 30 of a pump assembly 100 in a parallel-type configuration, also to provide a watertight, or substantially watertight, seal at the opening in the lower portion 30 of the pump assembly 100.

Serial-Type Configurations

Referring to FIGS. 4A and 4B, a pair of pump assemblies 100c, 100d are shown hydraulically joined in a serial-type configuration to provide greater pumping head. In the exemplary configuration, the first hollow portion 12d of the upper connection portion 10d of the lower pump assembly 100d is hydraulically coupled at and within the (inlet) opening 32c in the lower connection portion 30c of the upper pump assembly 100c. Optionally, in some applications, the hydraulic coupling may include a close sliding interference fit between the first hollow portion 12d of the upper connection portion 10d of the lower pump assembly 100d and the opening 32c in lower connection portion 30c of the upper pump assembly 100c. Advantageously, the close sliding interference fit is sufficient to provide a watertight, or substantially watertight, seal. Alternatively, in applications in which a close sliding interference fit does not provide a sufficiently watertight, or substantially watertight, seal, the upper 100c and lower pump assemblies 100d may require a more secure and reliable mechanical connection.

For example, in one implementation, one connection mechanism for mechanically connecting the upper connection portion 10d of the lower pump assembly 100d in a serial-type configuration with the lower connection portion 30c of the upper pump assembly 100c may include corresponding bayonet mount connections formed opposed to each other on the upper 10d and lower connection portions 30c of the respective, joined or to-be-joined pump assemblies 100d, 100c. As shown in FIG. 4B, for the purpose or illustration and not limitation, an embodiment of a bayonet mount connection for a serial quick connect/disconnect may include a pair of protrusions, pins, or catches 15d on the lower pump assembly 100d in combination with a corresponding pair of L-shaped slots 37c in receiving sockets 35c on the upper pump assembly 100c. More particularly, angularly opposed protrusions, pins, or catches 15d formed on or attached to the upper connection portion 10d of the lower pump assembly 100d may be operatively engaged in corresponding angularly opposed receiving sockets 35c formed in the annular wall 36c of the lower connection portion 30c of the upper pump assembly 100c. Accordingly, attaching pump assemblies 100c, 100d in a serial-type configuration may include, as the upper connection portion 10d of the lower pump assembly 100d is introduced into the lower connection portion 30c of the upper pump assembly 100c, introducing respective protrusions, pins, or catches 15*d* formed on or attached to the upper connection portion 10*d* of the lower pump assembly 100*d* into a corresponding receiving socket 35*c* formed in the annular wall 36*c* of the lower connection portion 30*c* of the upper pump assembly 100*c*. Once the first hollow portion 12*d* of the upper connection portion 10*d* and protrusions, pins, or catches 15*d* have been properly inserted, the pump assemblies 100*c*, 100*d* may be twisted about a common longitudinal axis in opposite directions, such that each protrusion, pin, or catch 15*d* enters the L-shaped slot 37*c* of the corresponding receiving socket 35*c*.

In a second implementation, another connection mechanism for mechanically connecting the upper connection portion 10*d* of the lower pump assembly 100*d* in a serial-type configuration to the lower connection portion 30*c* of the upper pump assembly 100*c* may include corresponding magnetic parts formed on or attached to the upper 10*d* and lower connection portions 30*c* of the respective, joined or to-be-joined pump assemblies 100*d*, 100*c*. A magnetic-type connection may include, for example, a first magnet portion, having a first magnetic polarity (negative or positive), disposed on the lower connection portion 30*c* of the upper pump assembly 100*c*, as well as a second magnet portion, having a second magnetic polarity that is opposite the polarity of the first magnet portion, disposed on the upper connection portion 10*d* of the lower pump assembly 100*d*. In some variations, each of the first and the second magnet portions may have a rectangular or bar shape or a (e.g., circular, ovoid, or the like) disk shape, such that a magnetic (mechanical) connection may be effected by bringing the exposed surfaces of the bar- or disk-shaped magnets into proximity with one another.

Alternatively, in another variation, a single magnetic annular ring may be adhesively or magnetically attached to, for example, the circumferential ring 13 of the upper connection portion 10*d* of the lower pump assembly 100*d*, such that a magnetic (mechanical) connection may be effected by bringing the exposed surface of the magnetic annular ring into contact with the ferrous metallic surface of the lower connection portion 30*c* of the upper pump assembly 100*c*. Those of ordinary skill in the art can appreciate that the single magnetic annular ring may also be adhesively or magnetically attached to the upper pump assembly 100*c* about the annular ring 34 on the planar portion 36 of the lower connection portion 30*c*, such that a magnetic (mechanical) connection may be effected by bringing the exposed surface of the magnetic annular ring into contact with a ferrous metallic surface of the upper connection portion 10*d* of the lower pump assembly 100*d*.

Figure 5A:
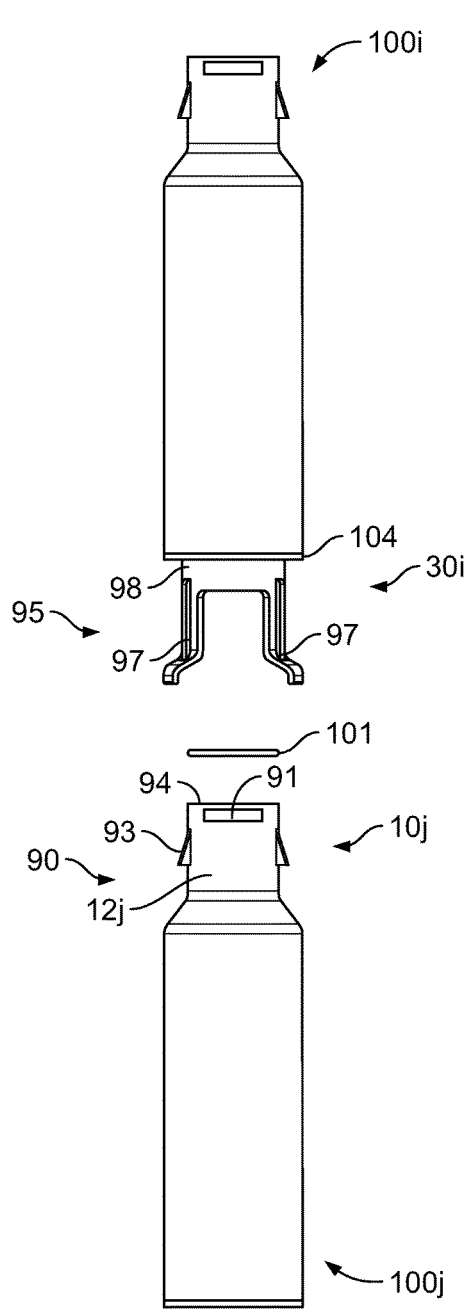
FIG. 5A shows an exploded view of upper and lower pump housings having first and second quick connects in accordance with some embodiments of the present invention.
Figure 5B:
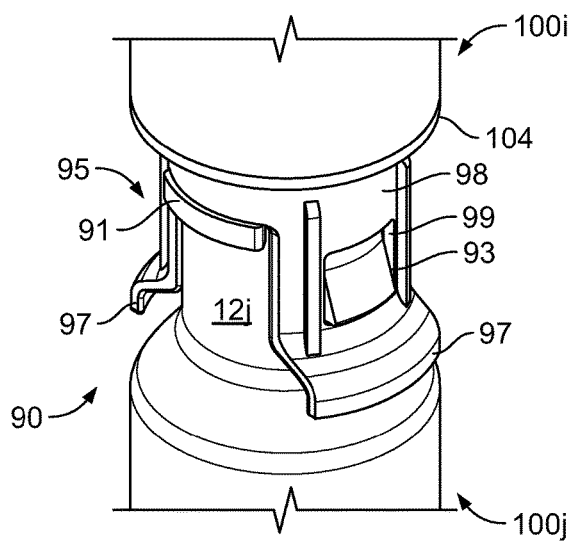
FIG. 5B shows a perspective view of the first and second quick connects of FIG. 5A in a connected state in accordance with some embodiments of the present invention.
Figure 5C:
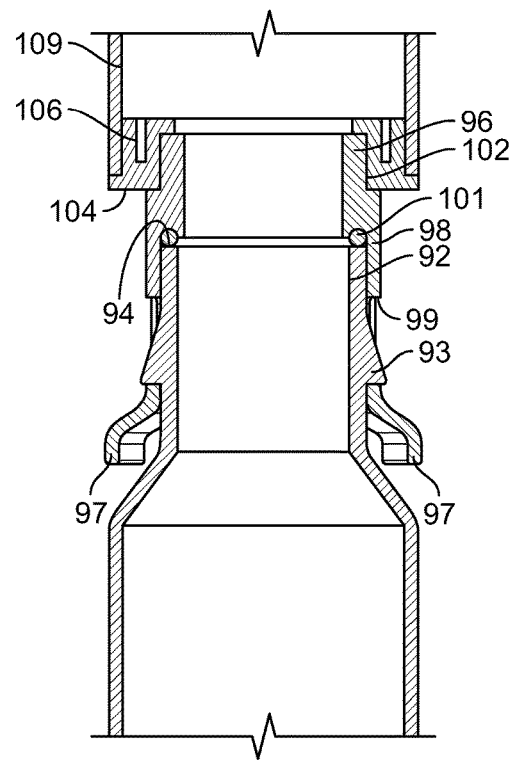
FIG. 5C shows a cross-sectional view of the first and second quick connect of FIG. 5B in accordance with some embodiments of the present invention.

In yet another implementation, a mechanism for mechanically connecting and fluidicly coupling an upper connection portion 10*j* of a lower pump assembly 100*j* in a serial-type configuration with a lower connection portion 30*i* of an upper pump assembly 100*i* may include a male connector 90 and a female connector 95, such as those shown in FIGS. 5A-5C. In a first variation, the male connector 90 and the female connector 95 may be fixedly attached to and/or incorporated into, respectively, the first hollow portion 12*j* of the upper connection portion 10*j* of the lower pump assembly 100*j* and the outer casing 109 of the upper pump assembly 100*i*. Alternatively, especially in the event of damage to either or both of the original male connector 90 and the female connector 95, an individual/replacement male connector 90' (FIG. 6A) may be adapted to be removably inserted over any remaining, undamaged portion (e.g., stub) of the original male connector 90 and/or an individual/replacement female connector 95' (FIG. 6A) may be adapted to be removably inserted into the (inlet) opening of the upper pump housing 100*i*.

In some embodiments, the male connector 90 may include the first hollow portion 12*j* of an upper connection portion 10*j* of the lower pump assembly 100*j*. A plurality of first protrusions 91 (e.g., rectangular protrusions), for providing a guide to facilitate connecting the female connector 95 to the male connector 90, may be formed on the sidewall of the first hollow portion 12*j*, for example, on diametrically opposing sides of the male connector 90. A plurality of second protrusions 93 (e.g., triangular protrusions), for releasably attaching the male connector 90 to the female connector 95, may be formed on the sidewall first hollow portion 12*j*, for example, on diametrically opposing sides of the male connector 90. The opening 92 of the first hollow portion 12*j* provides the outlet of the lower pump housing 100*j*. An annular shelf 94 located at the opening 92 provides a planar surface upon which a sealing device 101 (e.g., an O-ring, gasket, and the like) may be placed to provide a watertight or substantially watertight seal between the male connector 90 and the female connector 95 when the connectors 90, 95 are properly mechanically and operatively connected.

In some embodiments, the female connector 95 may include a hollow conduit defined by upper sidewall 96 and a lower sidewall 98. In some applications, an outer surface 102 of the upper sidewall 96 is fixedly attached to (e.g., adhesively, welded, bonded, and the like) to an annular ring 104 that is, in turn, is fixedly attached to (e.g., adhesively, welded, bonded, and the like) to an inner surface of the outer casing 109 of the upper pump housing 100*i*. The opening defined by and at a proximal end of the upper sidewall 96 of the female connector 95 may be structured and arranged to provide fluid communication and a watertight or substantially watertight seal with the (inlet) opening 32 of the lower upper connection portion 30*i* of the upper pump assembly 100*i*. The opening defined by and at a distal end of the lower sidewall 98 of the female connector 95 may be structured and arranged to provide fluid communication and a watertight or substantially watertight seal with the male connector 90. A sealing device 101 (e.g., an O-ring, gasket, and the like) may be placed, e.g., on the annular shelf 94 of the male connector 90, to provide a watertight or substantially watertight seal between the male connector 90 and the female connector 95 when the connectors 90, 95 are properly mechanically and operatively connected.

In some variations, a pair of flexible clips 97 are located on diametrically opposing portions of the lower sidewall 98. In some applications, an aperture or opening 99 may be formed in each flexible clip 97. Advantageously, the locations of the flexible clips 97 on the female connector 95, the locations of the apertures or openings 99 on the flexible clips 97, and the locations of the second protrusions 93 on the male connector 90 are adapted so that, as shown in FIGS. 5B and 5C, when properly attached, the aperture opening 99 of each flexible clip 97 engages and captures a corresponding second protrusion 93 to releasably connect the female connector 95 to the male connector 90. In some implementations, when the male 90 and female connectors 95 are properly attached, the sealing device 101 is compressed between the male connector 90 and the female connector 95, against the annular shelf 94, to provide a watertight or substantially watertight seal therebetween.

In some applications, e.g., to facilitate serial assembly of plural pump housings 100*i*, 100*j*, in order to better guide the flexible clips 97 to the second protrusions 93, gaps between the flexible clips 97 are left at the exposed, lower edge of the lower sidewall 98 in the female connector 95. The gap is configured to capture a pair of diametrically opposed, e.g., rectangular or substantially rectangular, first protrusions 91 formed on the male connector 90 to orient the flexible clips 97 and the apertures or openings 99 towards the second protrusions 93.

Disconnecting pump assemblies 100*i*, 100*j* in a serial-type configurations when the male 90 and female connectors 95 are fixedly attached to or incorporated into the pump assemblies 100*i*, 100*j*, may involve releasing the female connector 95 from the male connector 90, such that, in one variation, the flexible clips 97 may be simultaneously rotated away from the sidewall 91 of the male connector 90, so that the second protrusions 93 are no longer engaged or captured in the apertures or openings 99 of their respective flexible clips 97. Once the second protrusions 93 are free of the apertures or openings 99 in the flexible clips 97, the male connector 90 may be removed from inside the female connector 95.

Referring to FIG. 6A, those of ordinary skill in the art can appreciate that, when one or more of the male 90' and female connectors 95' is an individual/replacement piece, that the individual piece is similar to or substantially the same as those shown in FIGS. 5A-5C, except that, for individual/replacement male connector 90', either the outer diameter of the individual/replacement male connector 90' is sized to fit within the inner diameter of the (outlet) opening in the original first hollow portion or, alternatively, the inner diameter of the of the individual/replacement male connector 90' is sized to fit around the outer diameter of the original first hollow portion. For the individual/replacement female connector 95', the outer diameter of the upper sidewall of the individual/replacement female connector 95' would be sized to fit within the inner diameter of the (inlet) opening of the upper pump housing. Individual/replacement male and female connectors may be adapted to form watertight or substantially watertight seals when removably connected (e.g., by tight interference fit, screwed on or into by threadings, and the like) or fixedly attached (e.g., adhesively, welded, bonded, and the like) to any remaining portion of pump housing. Preferably, at least two sealing devices may be used at each connection or point of attachment to provide a watertight or substantially watertight seal.

When one or more of the male 90 and female connectors 95 is an individual piece, disconnecting pump assemblies 100*i*, 100*j* in a serial-type configurations may involve simply withdrawing the sidewall of the individual/replacement male connector 90' from within or about the remaining portion (e.g., stub) of the original first hollow portion 12*j* and/or withdrawing the upper sidewall 96 of the female connector 95 from within the (inlet) opening of the upper pump housing 100*i*.

Those of ordinary skill in the art can appreciate that when a connection manifold, such as shown in FIG. 2E, is used in a parallel-type configuration of multiple pump assemblies, special individual/replacement connectors may be used for coupling each outlet of the first hollow portion to the flexible conduit leading to the trunk union piece (i.e., an upper manifold) and for coupling the flexible conduit to the inlet opening of each female connector (i.e., a lower manifold). For example, for mechanically and hydraulically coupling the first hollow portion of each pump assembly to the flexible conduit leading to the trunk union piece of an upper manifold, a hybrid individual/replacement female connector similar to the female connector 95' (FIG. 6A) may be used. In some applications, the lower sidewall portion and flexible clips of the hybrid female connector may be the same or substantially the same as that shown and described in connection with the female connector 95 or the individual/replacement female connector 95'. The upper sidewall portion, however, may be longer and sized with an outer diameter that is slightly less than the inner diameter of the flexible conduit. In some variations, a series of annular rings may be formed proximate and on a distal end of the elongate upper sidewall portion to provide, when the elongate upper sidewall portion is inserted into the flexible conduit, a watertight or substantially watertight seal.

For mechanically and hydraulically coupling the flexible clips of the female connectors 90 located at the (inlet) openings of each pump assembly to the flexible conduit leading to the trunk union piece of a lower manifold, a hybrid individual/replacement male connector similar to the male connector 90' (FIG. 6A) may be used. For example, the hybrid male connector may be longer and sized with an outer diameter that is slightly less than the inner diameter of the flexible conduit. In some variations, a series of annular rings may be formed proximate and on a proximal end of the elongate sidewall portion to provide, when the elongate sidewall portion is inserted into the flexible conduit, a watertight or substantially watertight seal.

In still another implementation, a mechanism for mechanically connecting and fluidicly coupling a lower connection portion 30*k* of an upper pump assembly 100*k* with an upper connection portion 10*l* of a lower pump assembly 100*l* in a serial-type configuration may include a male connector 110 and a female connector 115, such as those shown in FIGS. 7A-7C. In some variations, the male connector 110 may be fixedly attached to (e.g., adhesively, bonded, welded, or the like) the outer casing of the upper pump assembly 100*k*, while the female connector 115 may be fixedly attached to (e.g., adhesively, bonded, welded, or the like) the outer casing of the lower pump assembly 100*l*.

In some embodiments, the male connector 110 may include a hollow conduit defined by an upper, e.g., cylindrical or substantially cylindrical, sidewall 112 and a lower, e.g., cylindrical or substantially cylindrical, sidewall 114, with an annular ring or disk 113 separating and delineating the two sidewalls 112, 114. Although embodiments of the invention will be described, such that the male connector 110 is of unitary construction, those of ordinary skill in the art can appreciate that the upper 112 and lower sidewalls 114 may, instead, be manufactured as a single, unitary piece and the annular ring or disk 113 attached to the peripheral surface thereof. Alternatively, the upper sidewall 112, the lower sidewall 114, and the annular ring or disk 113 may be manufactured as three individual pieces that may be joined together when needed.

The inner and outer diameters of each of the upper 112 and lower sidewalls 114 may be the same or substantially the same, or they may differ. In some implementations, the annular ring or disk 113 may form an annular piece having, in cross-section, a constant thickness or a partial frusto-conical profile (as shown in the drawings).

In some applications, the upper sidewall 112 may be formed at the (inlet) opening of the pump housing 100*k*, while an opening 111 may be formed in the lower sidewall 114 at a distal end thereof. When properly operative coupled to the female connector 115, the opening 111 in the lower sidewall 114 of the male connector 110 is structured and arranged to provide fluid communication and a watertight or substantially watertight seal with the female connector 115.

In some embodiments, the female connector 115 may include a hollow conduit defined by an upper, e.g., a cylindrical or substantially cylindrical, sidewall 116 and a lower, e.g., a cylindrical or substantially cylindrical, sidewall 117. In some variations, a pair of arms 119 may be formed to project from (e.g., in a direction parallel or substantially parallel to a longitudinal axis through the female connector 115) a peripheral surface of the upper sidewall 116. At least one protrusion (e.g., triangular protrusions) 120 may be formed on an inside portion or face of each arm 119, such that the protrusions 120 on the faces of the pair of arms 119 oppose or face each other. In some implementations, the lower sidewall 117 is formed integrally with an annular disk portion 105 having a projecting sidewall 103 formed about the peripheral edge of the annular disk portion 105. In some variations, the projecting sidewall 103 is perpendicular to or substantially perpendicular to the annular disk portion 105. An outer surface of the projecting sidewall 103 may be fixedly attached (e.g., adhesively, by plastic welding, and the like) to an inner surface 107 of the outer casing of the lower pump housing 100*l*.

In some applications, a proximal end and opening 118 of the upper sidewall 116 of the female connector 115 may be structured and arranged to provide fluid communication and a watertight or substantially watertight seal with the opening 111 and distal end in the lower sidewall 114 of the male connector 110. A sealing device 101 (e.g., an O-ring, gasket, and the like) may be placed to provide a watertight or substantially watertight seal between the male connector 110 and the female connector 115 when the connectors 110, 115 are properly mechanically and operatively connected. In some implementations, the point of juncture between the upper sidewall 116 and the lower sidewall 117 of the female connector 115 forms an annular shoulder 121 on which the sealing device 101 may be placed and against which the sealing device 101 may be compressed.

The protrusions 120 formed on the pair of arms 119 of the female connector 115 and the annular ring or disk 113 formed or located on the male connector 110 are provided for releasably attaching the male connector 110 to the female connector 115 once the lower sidewall 114 of the male connector 110 has been properly inserted into the opening 118 in the upper sidewall 116 of the female connector 115. As shown in FIGS. 7B and 7C when the sealing device 101 is sufficiently compressed, e.g., by the lower sidewall 114 of the male connector 110, against the annular shoulder 121 of the lower sidewall 117 of the female connector 115, each of the protrusions 120 on the pair of arms 119 engages an upper surface 122 of the annular ring or disk 113. Advantageously, the compressive force between the joined protrusions 120 and the annular ring or disk 113 are of such a magnitude that the sealing device remains compressed between the male connector 110 and female connector 115, so as to provide a watertight or substantially watertight seal.

Disconnecting pump assemblies in a serial-type configurations when the male 110 and female connectors 115 may involve releasing the female connector 115 from the male connector 110, such that, in one variation, the pair of arms 119 may be simultaneously rotated away from the annular ring or disk 113 of the male connector 110, so that the protrusions 120 no longer engage or capture the annular ring or disk 113. Once the protrusions 120 are free of the annular ring or disk 113, the lower sidewall 114 of the male connector 110 may be removed from inside the upper sidewall 116 of the female connector 115.

Referring to FIG. 6B, those of ordinary skill in the art can appreciate that, when one or more of the male 110' and female connectors 115' is an individual/replacement piece, that the individual piece is similar to or substantially the same as those shown in FIGS. 7A-7C, except that, for the individual/replacement male connector 110', either the outer diameter of the upper sidewall of the individual/replacement male connector 110' is sized to fit within the inner diameter of any remaining portion of the original male connector or, alternatively, the inner diameter of the upper sidewall of the individual/replacement male connector 110' is sized to fit around the outer diameter of any remaining portion of the original male connector. For the individual/replacement female connector 115', either the outer diameter of the lower sidewall of the individual/replacement female connector 115' is sized to fit within the inner diameter of any remaining portion of the original female connector or, alternatively, the inner diameter of the lower sidewall of the individual/replacement female connector 115' is sized to fit around the outer diameter of any remaining portion of the original female connector. Preferably, at least two sealing devices may be used at each connection or point of attachment to provide a watertight or substantially watertight seal.

When one or more of the male 110' and female connectors 115' is an individual piece, disconnecting the pump assemblies in a serial-type configurations may involve simply withdrawing the upper sidewall of the individual/replacement male connector 110' from within or about the remaining portion (e.g., stub) of the original male portion 110 and/or withdrawing the lower sidewall of the individual/replacement female connector 115', from within or about the remaining portion (e.g., stub) of the original female portion 115. Individual/replacement male and female connectors may be adapted to form watertight or substantially watertight seals when removably connected (e.g., by tight interference fit, screwed on or into by threadings, and the like) or fixedly attached (e.g., adhesively, welded, bonded, and the like) to any remaining portion of pump housing.

Those of ordinary skill in the art can appreciate that when a connection manifold, such as shown in FIG. 2E, is used in a parallel-type configuration of multiple pump assemblies, special individual/replacement connectors may be used for coupling each outlet of the female portion 115 to the flexible conduit leading to the trunk union piece (i.e., an upper manifold). For example, for mechanically and hydraulically coupling the female connector 115 of each pump assembly to the flexible conduit leading to the trunk union piece of an upper manifold, a hybrid individual/replacement male connector similar to the male connector 110' (FIG. 6B) may be used. In some applications, the lower sidewall portion and annular ring or disk of the hybrid male connector might be the same or substantially the same as that shown and described in connection with the male connector 110 or the individual/replacement male connector 110'. The upper sidewall portion of the hybrid male connector, however, may be longer and sized with an outer diameter that is slightly less than the inner diameter of the flexible conduit. In some variations, a series of annular rings may be formed proximate and on a distal end of the elongate upper sidewall portion to provide, when the elongate upper sidewall portion is inserted into the flexible conduit, a watertight or substantially watertight seal.

Figure 8:
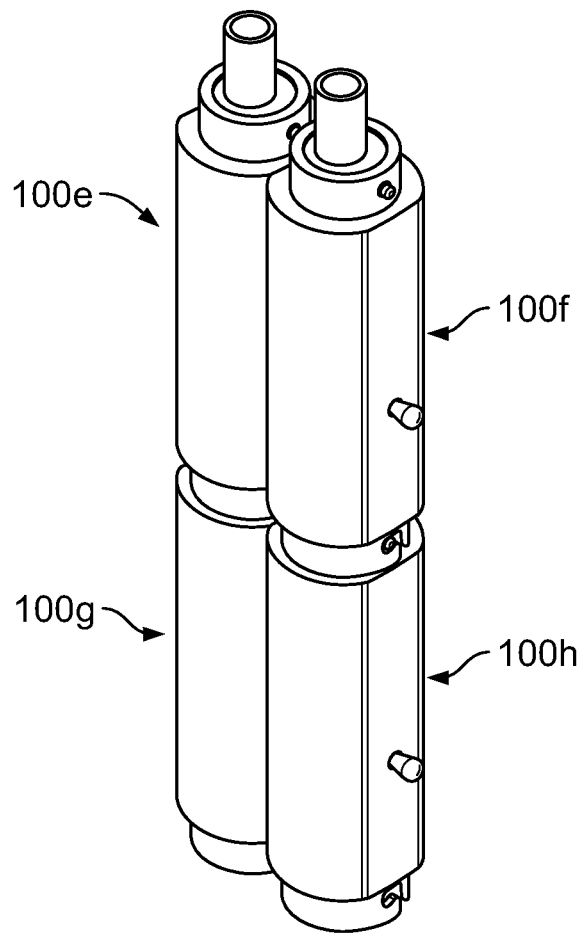
FIG. 8 shows a front perspective view of a four pump assemblies hydraulically coupled in parallel and in series in accordance with some embodiments of the present invention.

As shown in FIG. 8, a plurality of pump assemblies 100*e*, 100*f*, 100*g*, and 100*h* may be mechanically and hydraulically coupled in a configuration that includes both serial- and parallel-type configurations. For example, pump assembly 100*e* can be coupled in series with pump assembly 100*g* and pump assembly 100*f* can coupled in series with pump assembly 100*h*. The serial connections can also be coupled in parallel to adjacent pump assemblies, to provide both additional fluid flow and head pressure. Although FIG. 8 only shows a combination in a two-by-two arrangement, the number of pump assemblies in series does not have to be the same as the number of pump assemblies in parallel. For example, while a particular fluid flow requirement can be met using a pair of pump assemblies in a parallel-type configuration, the pumping head required may necessitate three or more pump assemblies in a serial-type configuration.

Electrical Connections and Insulation

Based on electric conductivity tests conducted on water, e.g., tap water and water having a salinity of about one-sixth the salinity of sea water, current flows of about 0.01 A and 1.2 A were measured between open terminals separated by about 12 mm in tap water and the saline water, respectively. For the latter, when the distance between terminals was increased to about 100 mm, current of about 0.33 A was measured. Advantageously, by isolating one terminal from the other, no current flow was measured. Accordingly, in some embodiments, the present invention uses an electrical isolating component, e.g., an O-ring, to electrically separate a positive terminal from a negative terminal and to seal one or more of the terminals from the water, since the pump assemblies are used in wet environments and may optionally be submerged.

Referring to FIG. 3A, a first embodiment of electrical connections includes inner 52 and outer electrical terminals 54 disposed on an upper connection portion 10' of a pump assembly for providing power to bayonet mount-type pump assemblies in a serial-type configuration. An isolation device, e.g., an O-ring 56, electrically separates the electrical terminals 52, 54. Although FIG. 3A shows that the electrical terminals 52, 54 are formed proximate each other on the upper connection portion 10' of the pump assembly, so that the (O-ring) isolation device 56 is disposed therebetween, this is done for illustrative purposes only. In one variation, in order to provide additional protection against current leakage, the electrical terminals 52, 54 may be formed on the upper connection portion 10' of the pump assembly diametrically opposed, on either side of the first hollow portion 12' of the upper connection portion 10', such that there is greater separation or distance between the terminals 52, 54. In another variation, the inner terminal 52 may be offset from the outer terminal 54 at an angle ranging between about 10 and about 180 degrees, as measured from a transverse axis extending through the opposing bayonet mount pins 15'.

Referring to FIG. 3B, a complementary first embodiment of electrical connections includes inner 51 and outer electrical terminals 53 on a lower connection portion 30' of a pump assembly for mechanically, hydraulically, and electrically connecting the lower connection portion 30' to the upper connection portion 10' of the pump assembly of FIG. 3A. In some applications, the inner terminal 51 is disposed on the planar portion 36' proximate the opening 32' and the outer terminal 53 is disposed on the annular ring 34'. Although FIG. 3B shows that the electrical terminals 51, 53 are formed proximate each other on the lower connection portion 30' of the pump assembly, this is done for illustrative purposes only. In one variation, in order to provide additional protection against current leakage, the electrical terminals 51, 53 also may be formed on the lower connection portion 30' of the pump assembly with the opening 32' disposed therebetween. In another variation, the inner terminal 51 may be offset from the outer terminal 53 at an angle ranging between about 10 and about 180 degrees as measured from a transverse axis extending through the opposing bayonet mount sockets 35'. Advantageously, the offset, e.g., a 10 degree or 180 degree offset, ensures that the pair of inner electrical terminals 51, 52 and the pair of outer terminal connections 53, 54 are properly connected in a correct radial position when the protrusions, pins, or catches 15', after being inserted in the corresponding sockets 35', are rotated into their respective L-shaped slots 37'.

A second embodiment of complementary electrical connections, viz., inner 51' and outer electrical terminals 53', on a lower connection portion 30" of a pump assembly, and inner 52' and outer electrical terminals 54', on an upper connection portion 10" of a pump assembly, for mechanically, hydraulically, and electrically connecting the lower connection portion 30" to the upper connection portion 10" is shown in FIGS. 3C-3E. Referring to FIG. 3C, inner 52' and outer annular ring electrical terminals 54' are disposed on an upper connection portion 10" of a pump assembly for providing power to a screw-on type coupling pump assemblies in a serial-type configuration. An isolation device, e.g., an O-ring 56', electrically separates the electrical terminals 52', 54'. For illustrative purposes only, FIG. 3C shows an embodiment that provides additional protection against current leakage, as the electrical terminals 52', 54' are formed on the upper connection portion 10" of the pump assembly with the first hollow portion 12" of the upper connection portion 10" and the (O-ring) isolation device 56' disposed between the terminals 52', 54', such that there is greater separation or distance between the terminals 52', 54'.

Referring to FIG. 3D, a complementary second embodiment of electrical connections includes inner 51' and outer electrical terminals 53' disposed on a lower connection portion 30" of a pump assembly for mechanically, hydraulically, and electrically connecting the lower connection portion 30" to the upper connection portion 10" of the pump assembly of FIG. 3C using a screw-on type coupling. In some applications, the inner terminal 51' is disposed on the planar portion 36" proximate the opening 32" and the outer terminal 53' is disposed on the annular ring 34". Although FIG. 3D shows that the electrical terminals 51', 53' are formed on other sides of the opening 32", this is done for illustrative purposes only. Indeed, the electrical terminals 51', 53' may also be formed more proximate and opposite one another, as are terminals 51 and 53 in FIG. 3B.

FIG. 3E shows the upper connection portion 10" of the pump assembly of FIG. 3C mechanically, hydraulically, and electrically connected to the lower connection portion 30" of the pump assembly of FIG. 3D, with a plurality of threadings 58 formed on the upper connection portion 10" and a threaded cap 59, having a plurality of threadings 57 formed thereon, rotatably attached to the upper connection portion 10". For additional water tightness, pipe dope, PTFE, tape, etc. may be inserted on or between the mating threadings.

Figure 9A:
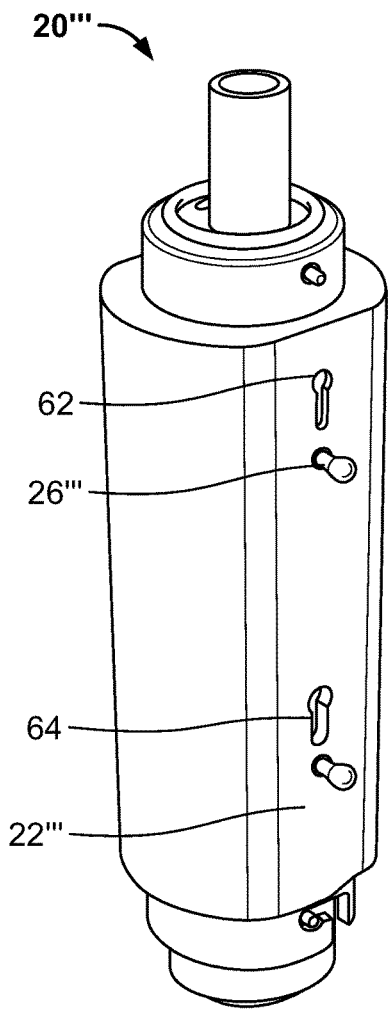
FIG. 9A shows a first side perspective view of electrical connections for electrically coupling a first pump assembly to a second pump assembly in a parallel-type configuration in accordance with some embodiments of the present invention.
Figure 9B:
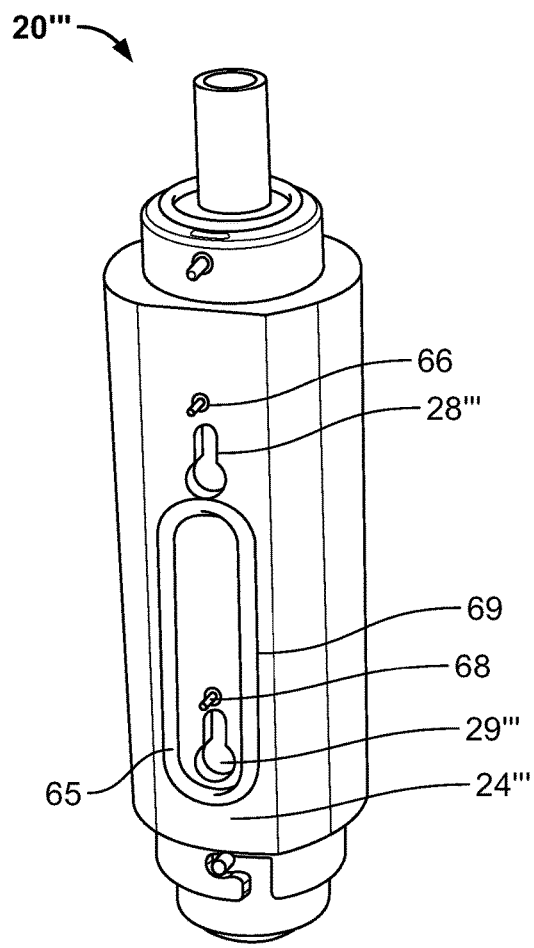
FIG. 9B shows a second side perspective view of the electrical connections for electrically coupling a first pump assembly to a second pump assembly in a parallel-type configuration in accordance with some embodiments of the present invention.

Referring to FIGS. 9A and 9B, electrical connection pairs, viz., upper 62 and lower electrical terminals 64 on one face 22''' of a pump housing 20''' of a pump assembly and upper 66 and lower electrical terminals 68 on a mating face 24''' of a pump housing 20''' of a pump assembly, provide power to sliding peg and slot connection-type pump assemblies in a parallel-type configuration. An isolation device, e.g., an O-ring 65, electrically separates the electrical terminal pairs of opposite polarity. The electrical terminal pairs are positioned on their respective faces 22''' and 24''', such that, once the slideable pegs 26''' on the first face 22''' of a first pump housing have been inserted into respective oversized openings 29''' on a second face 24''' of a second pump housing and the pump assemblies have been moved with respect to each other to translate the slideable pegs 26''' to a desired position within the slot connections 28''', the upper terminal 62 on the first face 22''' is electrically coupled to the upper terminal 66 on the second face 24''' and the lower terminal 64 on the first face 22''' is electrically coupled to the lower terminal 68 on the second face 24'''.

In some applications, isolation between the terminal pairs, when coupled, may be provided by a sealing device, e.g., O-ring 65, that is removable or adhesively attached to the second face 24''' about the lower terminal 68. For example, in one variation, a groove 69 sized to receive and accommodate the O-ring 65 may be formed in the surface of the second face 24'''. Advantageously, the groove 69 holds the O-ring 65 in position, thereby preserving the isolation against the sliding action when the pump assemblies are fitted together in a parallel-type configuration. To protect and isolate the electrical terminals disposed on faces of the pump assemblies in a parallel-type configuration, which are not coupled to other electrical terminals, a protective side cover or side plate may be removably attached to the exposed, unconnected face. Because, with any parallel-type configuration, one face of the outermost pump assemblies will be exposed, there is a need for a side cover or side plate for each of the exposed faces. For example, one of the side plates or side covers can include slot connections to interface with the slideable pegs 26''' of the exposed first face 22''', while the other slide plate or side cover can include slideable pegs to interface with the slot connections 28''' of the exposed second face 24'''.

Figure 10A:
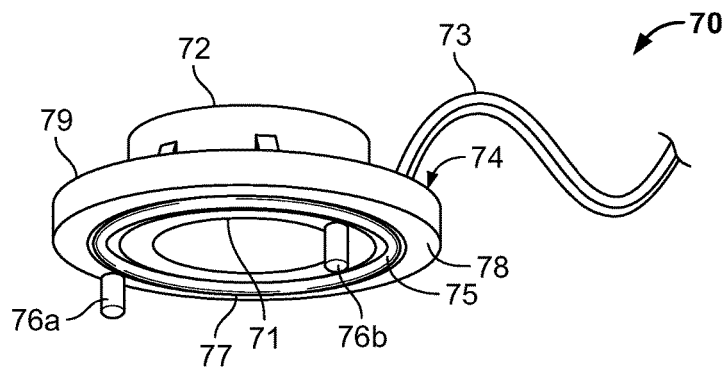
FIG. 10A shows a perspective view of an external electrical connection for a screw-on type connection in accordance with some embodiments of the present invention.
Figure 10B:
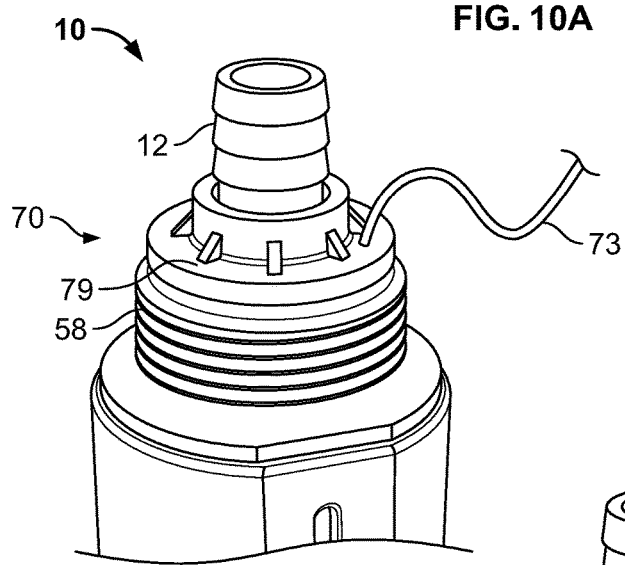
FIG. 10B shows a perspective view of the external electrical connection of FIG. 10A attached to an upper connection portion of a pump assembly in accordance with some embodiments of the present invention.
Figure 10C:
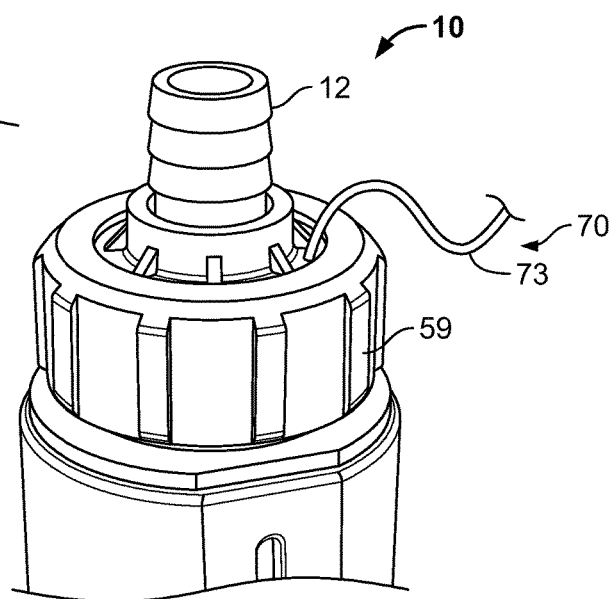
FIG. 10C shows a perspective view of a fully assembled external electrical connection and upper connection portion of FIG. 10B in accordance with some embodiments of the present invention.
Figure 10D:
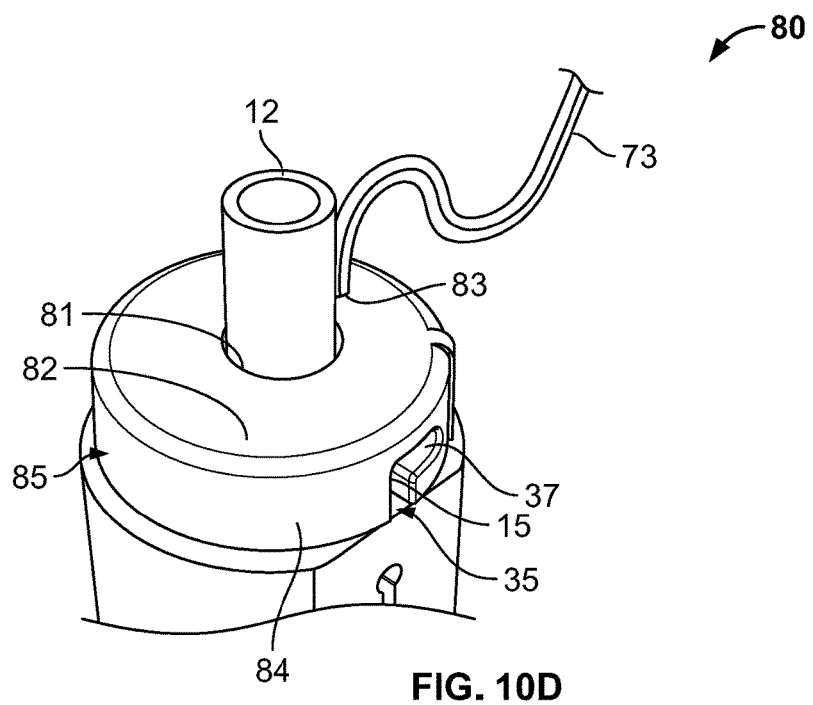
FIG. 10D shows a perspective view of an external electrical connection for a bayonet mount-type connection in accordance with some embodiments of the present invention.

FIGS. 10A through 10D show illustrative embodiments of external electrical connections 70, 80 for electrically coupling a pump assembly to a power source. FIGS. 10A through 10C, for example, show a first embodiment of an external electrical connection 70 for a screw-on type connection, while FIG. 10D shows a second embodiment of an external electrical connection 80 for a bayonet mount-type connection. In some implementations, the external electrical connection 70 is annular and includes an opening 71 that is sized to accommodate the first hollow portion 12 of the upper connection portion 10 of a pump assembly. In some variations, the annular electrical connection 70 may include an upper portion 72 and a bottom portion 74 having a top surface 79 and a bottom surface 78. A pair of terminals 76a, 76b, which are electrically coupled to a connection lead 73, project from the bottom surface 78 of the lower portion 74. The bottom surface 78 may include an annular groove 77 that is sized to receive and accommodate a sealing device 75, e.g., an O-ring, that is configured to isolate the inner terminal 76b from the outer terminal 76a. A distal end of the connection lead 73 is electrically coupled to a power supply source while a proximal end, which passes through the top surface 79 of the bottom portion 74, is electrically coupled to the pair of terminals 76a, 76b.

As shown in FIGS. 10B and 10C, in operation, the electrical connection 70 may be installed about the first hollow portion 12 of the upper connection portion 10, such that the pair of terminals 76a, 76b are in electrical communication with a pair of corresponding terminals 55', 52' (FIG. 3C) provided on the upper connection portion 10. To facilitate properly aligning each of the pair of terminals 76a, 76b atop its corresponding terminal 54', 52', a key, projection, or protuberance may be attached to or formed on the bottom surface 78 of the lower portion 74. In some variations, a channel or aperture for receiving the key, projection, or protuberance may be formed or provided in a planar portion of the upper connection portion 10. Alternatively, the terminals may be polarized, such that matching pairs of terminals attract one another or the terminals may be formed on annular rings.

Once the electrical connection 70 is properly installed on and about the first hollow portion 12, a screw-on cap 59 may be mechanically connected to the threadings 58 formed on the upper connection portion 10. The screw-on cap 59 may include an opening through which the first hollow portion 12, the electrical lead 73, the upper portion 72, and some portion of the lower portion 74 may extend.

As shown in FIG. 10D, when the power assemblies include bayonet mount-type connections, in some applications, the external electrical connection 80 for at least one of the power assemblies may include a rounded, cylindrical or substantially cylindrical cap 85 having a top portion 82 and a peripheral sidewall portion 84. In some variations, the top portion 82 may include apertures 81, 83 that are sized, respectively, to receive and accommodate the first hollow portion 12 of the upper connection portion 10 and to receive and accommodate the electrical leads 73. A pair of (e.g., diametrically opposing or angularly offset) sockets 35 having L-shaped slots 37 may be formed in the sidewall portion 84 and sized appropriately to receive and accommodate a protrusion, pin, or catch 15 located on the first hollow portion 12 of the upper connection portion 10 to complete the bayonet mount.

Filters

Figure 11A:
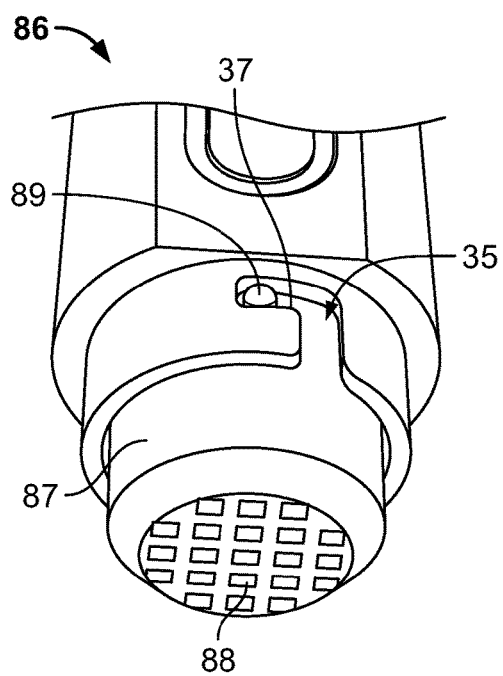
FIG. 11A shows a filter adapter coupled to a lower connection portion of a pump assembly using a bayonet mount-type connection in accordance with some embodiments of the present invention.
Figure 11B:
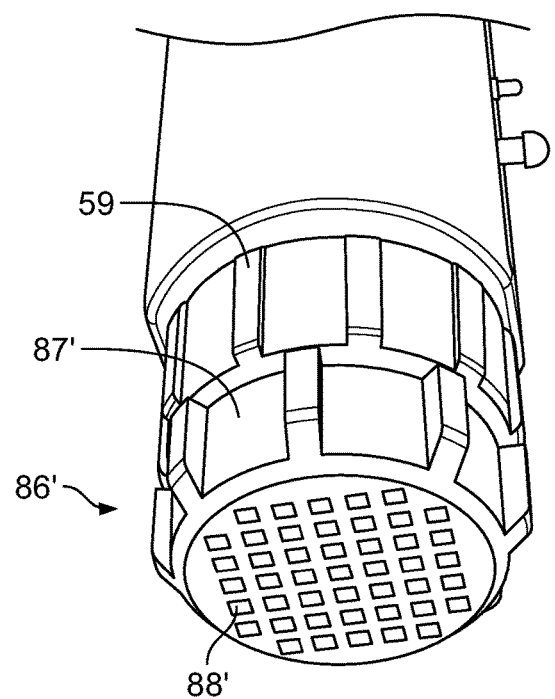
FIG. 11B shows a filter adapter coupled to a lower connection portion of a pump assembly using a screw-on type connection in accordance with some embodiments of the present invention.

In many uses, one or more of the pump assemblies may be all or partially submerged in well water or a pond, stream, etc. In such instances, a filter attachment may be removably attached at and to the lower connection portion of the pump assembly to prevent or minimize large particulate or other foreign matter from entering the inner workings of the pump assembly. FIGS. 11A and 11B show embodiments of two illustrative examples of filter attachments. For example, the filter attachment 86 shown in FIG. 11A may be used in connection with pump assemblies having bayonet mount-type connections. In some applications, the filter attachment 86 may include a thin-walled, hollow, cylindrical portion 87 that is insertable into the opening 32 of the lower connection portion 30 to provide a watertight, or substantially watertight, seal. The distal end of the cylindrical portion 87 may include a plurality of apertures 88 through which a fluid may be drawn. A screen material, e.g., a No. 200 screen, may be placed and held against the apertures 88 to catch sand and gravel size particles that may harm the inner workings of the pump assembly. In some variations, the distal end of the cylindrical portion 87 may be beveled (as shown). Advantageously, a pair of protrusions, pins, or catches 89 maybe formed, e.g., to be diametrically opposed to each other, on the outer surface of the cylindrical portion 87. As previously described, each of the pairs of protrusions, pins, or catches 89 is configured to fit and lock into corresponding L-shaped slots 37 of a bayonet mount-type socket 35.

The filter attachment 86' in FIG. 11B may be used in connection with pump assemblies having screw-on type connections. In some applications, the filter attachment 86' may include a thin-walled, hollow, cylindrical portion 87' that is threaded and insertable into the screw-on cap 59 of the lower connection portion 30 to provide a watertight, or substantially watertight, seal. In some variations, one or more knobs, ridges, flats, or protrusions may be formed on a peripheral surface of the cylindrical portion 87' to facilitate gripping and turning the cap 59, e.g., by hand or using a wrench. The distal end of the cylindrical portion 87' may include a plurality of apertures 88' through which a fluid may be drawn. A screen material, e.g., a No. 200 screen, may be placed and held against the apertures 88' to catch sand and gravel size particles that may harm the inner workings of the pump assembly.

Portable, Solar-Panel Powered Pump Assembly

Figure 12:
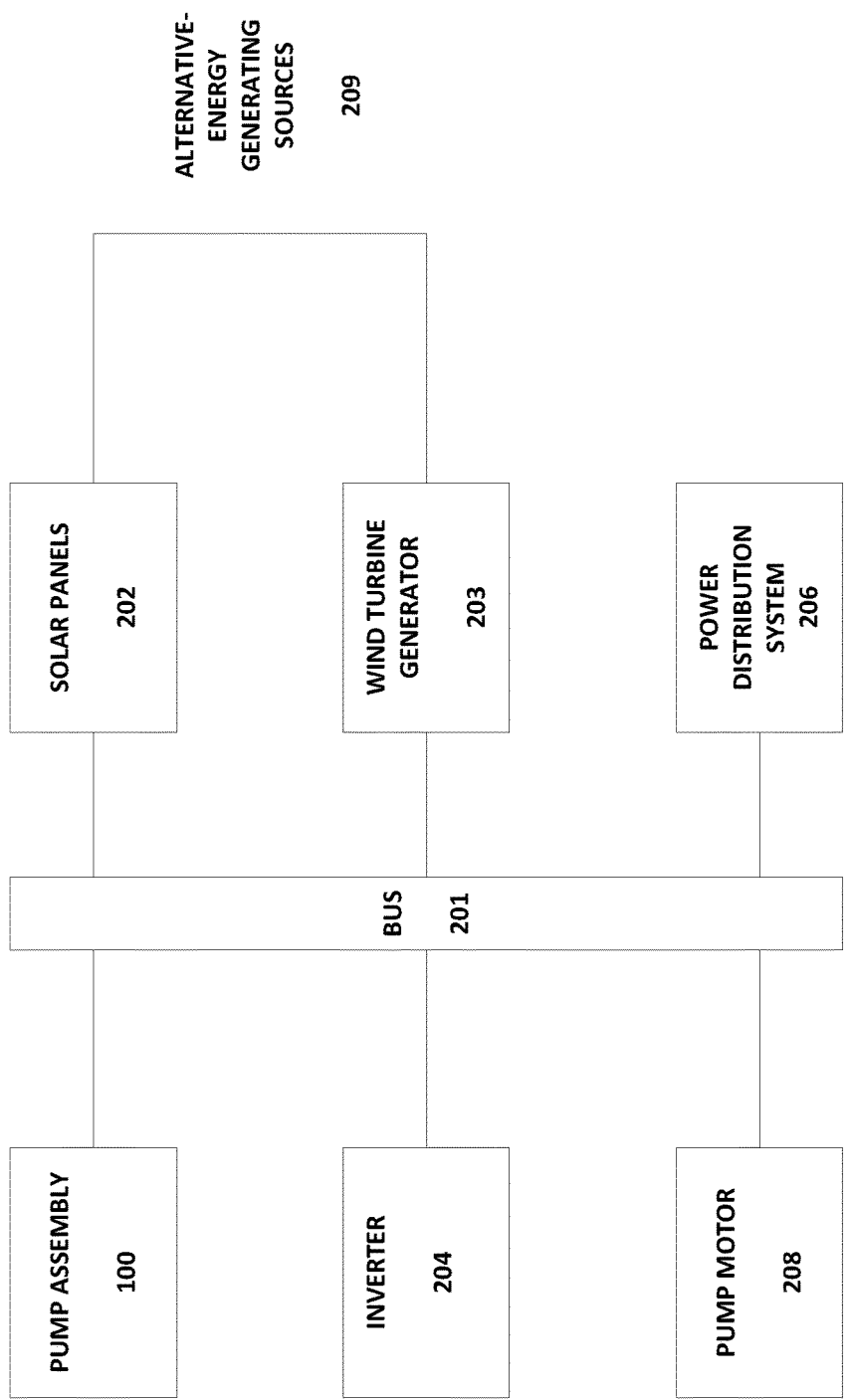
FIG. 12 shows a block diagram of a portable, alternative-energy powered pump assembly in accordance with some embodiments of the present invention.

Advantageously, multiple pump assemblies 100 and their associated fluid connections are relatively compact and lightweight, so as to be freely and easily transported, e.g., by one or a few persons, to remote sites. More advantageously, the pump motor, power distribution, and power delivery connections are adapted for use in remote areas and, in particular, to remote areas that are not serviced by an electrical (utility) power grid, a microgrid, or the like. Consequently, as shown in FIG. 12, in some embodiments, the portable pump assemblies 100 are further and advantageously adapted to be electrically couplable to an alternative-energy power generating system, e.g., one or more solar (photovoltaic) panels or modules 202, that generate alternating current (AC) power. In some variations, the PV panels or modules 202 are adapted to produce a relatively low- to medium-power capacity (e.g., up to about 120 kW).

Electrical current from the PV panels or modules 202 for delivering, for example, 24 VDC or the like, may be provided (e.g., via a utility bus 204) to a rectifier, inverter, converter, or the like 204, as well as to a power distribution system 206, where it can be converted to direct current and further distributed (e.g., as DC power) to the pump motor(s) 208. For the purpose of illustration and not limitation, the pump motors 208 can include an electric (DC) pump, a brushless (DC) pump, a rotary pump, a centrifugal pump, a submersible pump, an axial flow pump, a positive displacement pump, a reciprocating pump, and combinations thereof. Although the portable pump assembly 100 is described in terms of being powered by a lightweight, portable solar-panel(s) 202, those of ordinary skill in the art can appreciate that the portable pump assembly 100 may also be powered by other alternative and/or renewable power generating systems 209.

For example, in regions of the world with wind suitable for power generation, wind turbine generators 203, sail-rotor wind mills, or the like, some of which are portable and easily transported to remote areas, may be erected to provide power. Suitable wind turbine generators 203 may include horizontal axis devices, vertical axis devices, Darrieus-type devices, Gorlov devices, and so forth. Hybrid systems incorporating solar panels 202 for daytime operation and wind turbine generators 203 for day- and night-time operation are also within the scope of the present invention. Battery power may also be utilized.

While the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

The invention claimed is:

1. An apparatus comprising:
a pump housing including:
an inner chamber adapted to accommodate a pump;
an inlet for drawing fluid into the pump;
an outlet for expelling fluid from the pump; and
an elongate outer casing surrounding the inner chamber and comprising each of a first quick connect comprising a sliding peg-slot connector and a second quick connect,
wherein a sliding peg of the sliding peg-slot connector is formed on a convex portion of the elongate outer casing and a slot connector of the sliding peg-slot connector is formed in a concave portion of the elongate outer casing, and
wherein the pump housing is configured for coupling to another pump housing in at least one of a serial configuration and a parallel configuration using at least one of the quick connects.

2. The apparatus of claim 1, wherein the elongate outer casing is at least one of substantially cylindrical in shape, rectangular-shaped, box-like, and substantially sector-shaped.

3. The apparatus of claim 1, wherein the elongate outer casing comprises opposing faces selected from the group consisting of planar and arcuate.

4. The apparatus of claim 1, wherein the elongate outer casing comprises opposing arcuate faces comprising convex and concave faces, such that a convex face of a first outer casing is couplable to a concave face of a second outer casing to provide the parallel configuration of pump assemblies.

5. The apparatus of claim 1, wherein the slot connector forms a non-linear opening.

6. The apparatus of claim 1, wherein the second quick connect is selected from the group consisting of a bayonet-type connection, a screw-on type connection, magnets of opposing polarity, a hollow conduit comprising a flexible clip including an opening on a sidewall thereof, and a hollow conduit comprising at least one of an annular ring and a disk on a sidewall thereof.

7. The apparatus of claim 1, wherein the second quick connect comprises a bayonet-type connection formed at an end of the outer casing and couplable with a mating bayonet-type connection formed at an end of another outer casing to provide the serial configuration of pump assemblies.

8. The apparatus of claim 1, wherein the pump housing is adapted to couple to a plurality of other pump housings in a combined serial and parallel configuration.

9. The apparatus of claim 1, wherein the second quick connect is located at an end of the pump housing.

10. The apparatus of claim 1, wherein the second quick connect comprises components located at opposing ends of the pump housing.

11. An apparatus comprising:
a pump housing including:
an inner chamber adapted to accommodate a pump;
an inlet for drawing fluid into the pump;
an outlet for expelling fluid from the pump;
an elongate outer casing surrounding the inner chamber and comprising each of a first quick connect and a second quick connect; and
a pump motor disposed in the inner chamber,
wherein the pump housing is configured for coupling to another pump housing in at least one of a serial configuration and a parallel configuration using at least one of the quick connects.

12. The apparatus of claim 11, wherein the pump motor is selected from the group consisting of an electric (DC) pump, a brushless (DC) pump, a rotary pump, a centrifugal pump, a submersible pump, an axial flow pump, a positive displacement pump, a reciprocating pump, and combinations thereof.

13. The apparatus of claim 11, wherein
the first quick connect is disposed at the outlet;
the second quick connect is disposed at the inlet; and the pump housing is configured for coupling to the other pump housing in a serial configuration using at least one of the quick connects.

14. An apparatus comprising:
a pump housing including:
an inner chamber adapted to accommodate a pump;
an inlet for drawing fluid into the pump;
an outlet for expelling fluid from the pump; and
an elongate outer casing surrounding the inner chamber and comprising each of a first quick connect disposed at the outlet and a second quick connect disposed at the inlet,
wherein the first quick connect comprises:
a sidewall defining a hollow conduit;
a proximal end in fluid communication with the outlet of the pump housing;
a distal end adapted to form fluid communication with and to be removably attachable to a second quick connect of another pump housing; and
a plurality of protrusions located on the sidewall, each protrusion adapted to engage a corresponding opening passing through a flexible clip of the second quick connect of the other pump housing for coupling the pump housing to the other pump housing in a serial configuration.

15. The apparatus of claim 14, wherein the first quick connect is at least one of fixedly attached to the outlet, incorporated into the outlet, and removably attachable to some portion of the pump housing proximate the outlet.

16. The apparatus of claim 14, wherein the second quick connect comprises:
a sidewall defining a hollow conduit;
a distal end adapted to form fluid communication with and to be removably attachable to a first quick connect of another pump housing;
a proximal end in fluid communication with the inlet of the pump housing; and
a flexible clip comprising a plurality of openings, each opening configured for retaining a corresponding protrusion located on a sidewall of the first quick connect of the other pump housing.

17. The apparatus of claim 16, wherein the second quick connect is at least one of fixedly attached to the inlet, incorporated into the inlet, and removably attachable to some portion of the pump housing proximate the inlet.

18. The apparatus of claim 13 further comprising a sealing device located between the first quick connect and the second quick connect.

19. An apparatus comprising:
a pump housing including:
an inner chamber adapted to accommodate a pump;
an inlet for drawing fluid into the pump;
an outlet for expelling fluid from the pump; and
an elongate outer casing surrounding the inner chamber and comprising each of a first quick connect disposed at the inlet and a second quick connect disposed at the outlet, wherein the second quick connect comprises:
a sidewall defining a hollow conduit;
a proximal end in fluid communication with the outlet of the pump housing;
a distal end adapted to form fluid communication with and to be removably attachable to a first quick connect of another pump housing; and
a plurality of arms extending from the sidewall, each arm comprising a corresponding protrusion adapted to engage at least one of an annular ring and a disk located on the first quick connect of the other pump housing for coupling the pump housing to the other pump housing in a serial configuration.

20. The apparatus of claim 19, wherein the second quick connect is at least one of fixedly attached to the outlet, incorporated into the outlet, and removably attachable to some portion of the pump housing proximate the outlet.

21. The apparatus of claim 19, wherein the first quick connect comprises:
a sidewall defining a hollow conduit;
a distal end adapted to form fluid communication with and to be removably attachable to a second quick connect of another pump housing;
a proximal end in fluid communication with the inlet of the pump assembly; and
at least one of an annular ring and a disk configured to retain at least one of the plurality of protrusions located on any arm of another first quick connect of another pump housing.

22. The apparatus of claim 21, wherein the first quick connect is at least one of fixedly attached to the inlet, incorporated into the inlet, and removably attachable to some portion of the pump housing proximate the inlet.

23. The apparatus of claim 19, wherein the elongate outer casing is at least one of substantially cylindrical in shape, rectangular-shaped, box-like, and substantially sector-shaped.

24. The apparatus of claim 19, wherein the elongate outer casing comprises opposing faces selected from the group consisting of planar and arcuate.

25. The apparatus of claim 19, wherein the elongate outer casing comprises opposing arcuate faces comprising convex and concave faces, such that a convex face of a first outer casing is couplable to a concave face of a second outer casing to provide a parallel configuration of pump assemblies.

26. The apparatus of claim 19, wherein the pump housing is adapted to couple to a plurality of other pump housings in a combined serial and parallel configuration.

27. The apparatus of claim 19 further comprising a sealing device located between the first quick connect and the second quick connect.

28. The apparatus of claim 21, wherein the sidewall of the first quick connect comprises an upper sidewall portion and a lower sidewall portion delineated by at least one of the annular ring and the disk.

29. The apparatus of claim 28, wherein at least one of:
the upper sidewall portion and the lower sidewall portion are manufactured as a single unitary piece to which at least one of the annular ring and the disk is attachable; and
the upper sidewall portion, the lower sidewall portion, and at least one of the annular ring and the disk are manufactured as a single unitary piece.

30. The apparatus of claim 21, wherein each protrusion of the second quick connect is structured and arranged to engage a surface of at least one of the annular ring and the disk to provide a watertight seal.

* * * * *